(12) United States Patent
Ye et al.

(10) Patent No.: US 10,440,340 B2
(45) Date of Patent: Oct. 8, 2019

(54) PROVIDING 3D LOOK-UP TABLE (LUT) ESTIMATION FOR COLOR GAMUT SCALABILITY

(71) Applicant: Vid Scale, Inc., Wilmington, DE (US)

(72) Inventors: Yan Ye, San Diego, CA (US); Jie Dong, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 15/875,638

(22) Filed: Jan. 19, 2018

(65) Prior Publication Data

US 2018/0146181 A1    May 24, 2018

Related U.S. Application Data

(63) Continuation of application No. 14/568,807, filed on Dec. 12, 2014, now Pat. No. 9,912,925.

(Continued)

(51) Int. Cl.
*H04N 19/10* (2014.01)
*H04N 19/117* (2014.01)
(Continued)

(52) U.S. Cl.
CPC ............... *H04N 9/67* (2013.01); *H04N 1/64* (2013.01); *H04N 9/64* (2013.01); *H04N 11/24* (2019.01);
(Continued)

(58) Field of Classification Search
CPC .... H04N 19/10; H04N 19/117; H04N 19/132; H04N 19/189; H04N 19/34; H04N 19/36
(Continued)

(56) References Cited

U.S. PATENT DOCUMENTS 5,650,824 A    7/1997  Huang
5,737,032 A    4/1998  Stenzel et al.
(Continued)

FOREIGN PATENT DOCUMENTS

CN    1620150 A    5/2005
CN    1859576 A    11/2006
(Continued)

OTHER PUBLICATIONS

Alshina, Elena, "AhG14: On Bit-Depth Scalability Support", JCTVC-N0218, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, 6 pages.

(Continued)

*Primary Examiner* — Dominic D Saltarelli
(74) *Attorney, Agent, or Firm* — Condo Roccia Koptiw LLP

(57) ABSTRACT

Systems and/or methods for estimating color conversion components. A video coding device may receive a picture associated with a first color space. The picture may comprise a first component at a first sampling location, a second component at a second sampling location and the second component at a third sampling location. The video coding device may apply a first interpolation filter to the second component at the second sampling location and the second component at the third sampling location to determine the second component at the first sampling location. The second component at the first sampling location may be associated with the first color space. The video coding device may apply a color conversion model to the first component at the first sampling location and to the second component at the first sampling location to translate the first component at the first sampling location to a second color space.

19 Claims, 15 Drawing Sheets
(3 of 15 Drawing Sheet(s) Filed in Color)

US 10,440,340 B2
Page 2

Related U.S. Application Data

(60) Provisional application No. 61/915,892, filed on Dec. 13, 2013.

(51) Int. Cl.
| | |
|---|---|
| *H04N 19/132* | (2014.01) |
| *H04N 19/189* | (2014.01) |
| *H04N 19/34* | (2014.01) |
| *H04N 19/36* | (2014.01) |
| *H04N 9/67* | (2006.01) |
| *H04N 13/139* | (2018.01) |
| *H04N 13/15* | (2018.01) |
| *H04N 13/161* | (2018.01) |
| *H04N 11/24* | (2006.01) |
| *H04N 1/64* | (2006.01) |
| *H04N 9/64* | (2006.01) |
| *H04N 19/30* | (2014.01) |
| *H04N 19/186* | (2014.01) |
| *H04N 19/80* | (2014.01) |
| *H04N 19/85* | (2014.01) |
| *H04N 19/59* | (2014.01) |
| *H04N 19/597* | (2014.01) |

(52) U.S. Cl.
CPC ........... *H04N 13/139* (2018.05); *H04N 13/15* (2018.05); *H04N 13/161* (2018.05); *H04N 19/186* (2014.11); *H04N 19/30* (2014.11); *H04N 19/59* (2014.11); *H04N 19/597* (2014.11); *H04N 19/80* (2014.11); *H04N 19/85* (2014.11)

(58) Field of Classification Search
USPC ................................................. 375/240.02
See application file for complete search history.

(56) References Cited

U.S. PATENT DOCUMENTS

| | | | |
|---|---|---|---|
| 6,301,393 B1 | 10/2001 | Spaulding et al. | |
| 6,400,843 B1 | 6/2002 | Shu et al. | |
| 6,741,263 B1* | 5/2004 | Pether | G09G 5/026 |
| | | | 345/600 |
| 7,684,084 B2 | 3/2010 | Fan et al. | |
| 8,908,761 B2 | 12/2014 | Nilsson et al. | |
| 9,270,871 B2 | 2/2016 | Pahalawatta et al. | |
| 9,538,176 B2 | 1/2017 | Tourapis | |
| 9,549,194 B2 | 1/2017 | Ye et al. | |
| 9,673,936 B2 | 6/2017 | Dharmapurikar et al. | |
| 2005/0219574 A1 | 10/2005 | Ok et al. | |
| 2006/0126962 A1 | 6/2006 | Sun | |
| 2006/0209959 A1 | 9/2006 | Sun | |
| 2006/0274335 A1 | 12/2006 | Wittenstein | |
| 2008/0175497 A1 | 7/2008 | Segall | |
| 2008/0205513 A1 | 8/2008 | Xiong et al. | |
| 2009/0003458 A1 | 1/2009 | Au et al. | |
| 2009/0080041 A1 | 3/2009 | Fan et al. | |
| 2010/0008427 A1 | 1/2010 | Chiu et al. | |
| 2010/0020866 A1 | 1/2010 | Marpe et al. | |
| 2011/0234620 A1 | 9/2011 | Koyama | |
| 2012/0001963 A1 | 1/2012 | Hinnen et al. | |
| 2012/0014455 A1 | 1/2012 | Joshi et al. | |
| 2013/0077696 A1 | 3/2013 | Zhou | |
| 2013/0156311 A1 | 6/2013 | Choi et al. | |
| 2014/0281836 A1 | 9/2014 | Dharmapurikar et al. | |
| 2015/0172670 A1 | 6/2015 | Li et al. | |
| 2015/0341675 A1* | 11/2015 | Su | H04N 19/117 |
| | | | 375/240.15 |
| 2016/0295219 A1 | 10/2016 | Ye et al. | |

FOREIGN PATENT DOCUMENTS

| | | |
|---|---|---|
| CN | 101005620 A | 7/2007 |
| CN | 101449476 A | 6/2009 |
| CN | 101977316 A | 2/2011 |
| CN | 103167295 A | 6/2013 |
| EP | 0605893 A1 | 7/1994 |
| JP | 2008-533909 A | 8/2008 |
| JP | 2010-507941 A | 3/2010 |
| JP | 2013-534795 A | 9/2013 |
| RU | 2190306 C2 | 9/2002 |
| RU | 2011140810 A | 4/2013 |
| WO | WO 2005/013087 A2 | 2/2005 |
| WO | WO 2014/166705 A1 | 10/2014 |

OTHER PUBLICATIONS

Auyeung, Cheung, "Color Gamut Scalable Video Coding with Piecewise Linear Predictions", JCTVC-N0271, Joint Collaborative Team on Video Coding (JCT-VC) of ITU-T SG 16 WP 3 and ISO/IEC JTC 1/SC 29/WG 11, 14th Meeting: Vienna, Austria, AT, Jul. 29-Aug. 2, 2013, pp. 1-3.

Auyeung, Cheung, "Non-SCE4: Picture and Region Adaptive Gain-Offset Prediction for Color Space Scalability", JCTVC-00195, Joint Collaborative Team on Video Coding of ISO/IEC JTC1/SC29/WG11 and ITU-T SG., Geneva, CH, Oct. 1-Nov. 1, 2013, 7 pages.

Balaji et al., "Preprocessing Methods for Improved Lossless Compression of Color Look-Up Tables", Journal of Imaging Science and Technology, Jul. 22, 2008, 9 pages.

Bordes et al., "AHG14: Color Gamut Scalable Video Coding using 3D LUT", JCTVC-M0197, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, 10 pages.

Bordes et al., "AHG14: Color Gamut Scalable Video Coding Using 3D LUT: New Results", JCTVC-N0168-r1, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-11.

Bordes et al., "Color Mapping SEI Message", JCTVC-N0180, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-10.

Bordes et al., "Description of HEVC Scalable Extension Core Experiment SCE1: Color Gamut and Bit-Depth Scalability", JCTVC-011 01, Joint Collaborative Team on Video Coding of ISO/IEC JTC1/SC29/WG11 and ITU-T SG., Geneva, CH, Oct. 2013.

Bordes et al., "SCE4: Results on 5.3-TEST1 and 5.3-TEST2", JCTVC-00159, Joint Collaborative Team on Video Coding (JCT-VC) of ITU-T SG 16 WP 3 and ISO/IEC JTC 1/SC 29/WG 11, 15th Meeting, Geneva, CH, Oct. 23-Nov. 1, 2013, pp. 1-12.

Bross et al., "High Efficiency Video Coding (HEVC) Text Specification Draft 7", JCTVC-11003_d9, Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 280 pages.

Chen et al., "SHVC Draft 3", JCTVC-N1 008_v1, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, 71 pages.

Guo et al., "Signaling of Phase Offset in Up-Sampling Process and Chroma Sampling Location", JCTVC-M0465, Joint Collaborative Team on Video Coding (JCT-VC) of ITU-T SG 16 WP 3 and ISO/IEC JTC 1/SC 29/WG 11, 13th Meeting, Incheon, KR, Apr. 18-26, 2013, pp. 1-8.

He et al., "Non-SCE4/AHG14: Combined Bit-Depth and Color Gamut Conversion with 3D LUT for SHVC Color Gamut Scalability", JCTVC-00161, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, 7 pages.

Husak et al., "Ad Hoc on MPEG Frame Compatible (MFC) Stereo Coding", MPEG, Document No. m24033, Nov. 2011, 3 pages.

ISO, "Information Technology—Coding of Audio-Visual Objects—Part 2:Visual", International Standard, ISO/IEC 14496-2, Second Edition, Dec. 1, 2001, 536 pages.

ISO, "Information Technology—Coding of Moving Pictures and Associated Audio for Digital Storage Media at Up to About 1,5 Mbit/s—Part 2: Video", International Standard, ISO/IEC 11172-2,

(56) References Cited

OTHER PUBLICATIONS

Technical Corrigendum 3, Nov. 1, 2003, 6 pages.
ISO, "Information Technology—Generic Coding of Moving Pictures and Associated Audio information: Video", ISO/IEC 13818-2, Dec. 2000, 220 pages.
ISO, "Joint Call for Proposals on Scalable Video Coding Extensions of High Efficiency Video Coding (HEVC)", N12957, ISO/IEC JTC 1/SC 29/WG 11 and ITU-T SG 16 WP 3, Stockholm, Sweden, Jul. 2012, 11 pages.
ITU, "Series H: Audiovisual and Multimedia Systems Coding of Moving Video—Codec for Audiovisual Services at n x 384 kbit/s", International Telecommunication Union, CCITT, H.261, Nov. 1988, 14 pages.
ITU, "Series H: Audiovisual and Multimedia Systems Infrastructure of Audiovisual Services—Coding of Moving Video—Advanced Video Coding for Generic Audiovisual Services", ITU-T, H.264, Nov. 2007, 563 pages.
ITU, "Terms of Reference of the Joint Collaborative Team on 3D Video Coding Extension Development", ITU-T 06/16 Visual Coding and ISO/IEC JTC1/SC29/WG11, Coding of Moving Pictures and Audio, May 2012, 4 pages.
ITU, "Transmission of Non-Telephone Signals-Video Coding for Low Bit Rate Communication", International Telecommunication Union, ITU-T, H.263, Mar. 1996, 52 pages.
ITU-R, "Parameter Values for the HDTV Standards for Production and International Programme Exchange", Recommendation ITU-R BT 709, Dec. 2010, 19 pages.
ITU-R, "Parameter Values for the HDTV Standards for Production and International Programme Exchange", ITU-R Recommendation BT 2020, Apr. 2012, 8 pages.
Kerofsky et al., "Color Gamut Scalable Video Coding: New Results", JCTVC-L0334, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 17 pages.
Li et al., "Non-SCE4: Weighted Prediction Based Color Gamut Scalability", JCTVC-O0180, Joint Collaborative Team on Video Coding of ISO/IEC JTC1/SC29/WG11 and ITU-T SG.16, Geneva, CH, Oct. 1-Nov. 1, 2013, 5 pages.

Luthra et al., "Requirements of the Scalable Enhancement of HEVC", N12956, ISO/IEC JTC1 /SC29/WG11, Coding of Moving Pictures and Audio, Stockholm, Sweden, Jul. 2012, 12 pages.
Luthra et al., "Use Cases of the Scalable Enhancement of HEVC", N12955, ISO/IEC JTC1/SC29/WG11, Coding of Moving Pictures and Audio, Stockholm, Sweden, Jul. 2012, 8 pages.
MPEG, "Call for Proposals on 3D Video Coding Technology", MPEG document No. w12036, Mar. 2011, 20 pages.
Muller et al., "Ad hoc on 3D Video Coding", MPEG Document No. m24033, Geneva, CH, Apr. 2012, 25 pages.
Ohm, Jens-Rainer, "Advances in Scalable Video Coding", Proceedings of the IEEE, vol. 93, No. 1, Jan. 2005, pp. 42-56.
Schwarz et al., "Overview of the Scalable Video Coding Extension of the H.264/AVC Standard", IEEE Transactions on Circuits and Systems for Video Technology, vol. 17, No. 9, Sep. 2007, 18 pages.
Segall et al., "Description of Core Experiment SCE4: Color Gamut and Bit-Depth Scalability", JCTVC-N 1104, Joint Collaborative Team on Video Coding (JCT-VC) of ITU-T SG 16 WP 3 and ISO/IEC JTC 1 /SC 29/WG 11, 14th Meeting: Vienna, AT, Jul. 25-Aug. 2, 2013, 5 pages.
Segall et al., "SCE4: Summary Report of Color Gamut and Bit Depth Scalability", JCTVC-O0034, Joint Collaborative Team on Video Coding (JCT-VC) of ITU-T SG 16 WP 3 and ISO/IEC JTC 1/SC 29/WG 11, Geneva, CH, Oct. 1-Nov. 1, 2013, 4 pages.
SMPTE, "Derivation of Reference Signals for Television Camera Color Evaluation", RP 176-1997, Reaffirmed 2003, Dec. 5, 1997,3 pages.
Sullivan, Gary J., "Rate-Distortion Optimization for Video Compression", Signal Processing Magazine, IEEE, vol. 15, No. 6, Nov. 1998, pp. 74-90.
Vetro et al., "Overview of the Stereo and Multiview Video Coding Extensions of the H.264/MPEG-4 AVC Standard", Mitsubishi Electric Research Laboratories, Proceedings of IEEE, Jan. 31, 2011, pp. 626-642.
Wikipedia, "3D Lookup Table",Available at https://en.wikipedia.org/wiki/3D_lookup_table , Retrieved on Jun. 23, 2017, 2 pages.
Wikipedia, "Least Squares", Available at https://en.wikipedia.org/wiki/Least_squares , Retrieved on Jun. 27, 2017, 12 pages.
Wikipedia, "Trilinear Interpolation", Available at https://en.wikipedia.org/wiki/Trilinear_Interpolation , Retrieved on Jun. 23, 2017, 3 pages.

* cited by examiner

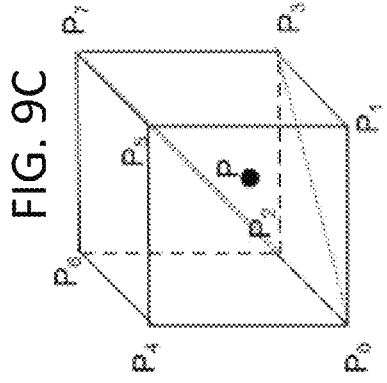
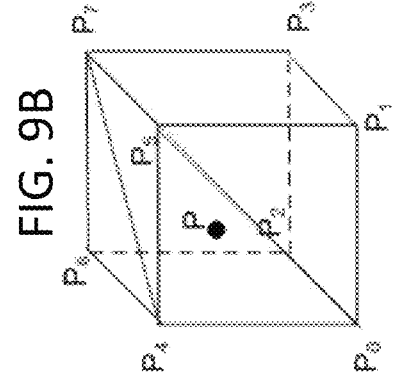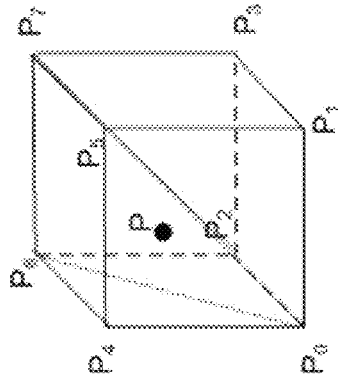
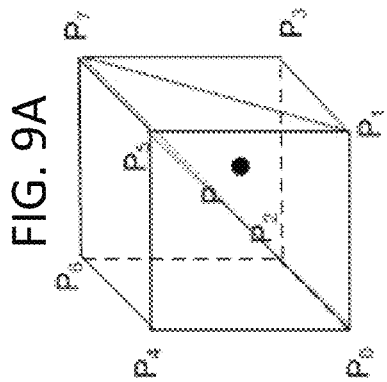

PROVIDING 3D LOOK-UP TABLE (LUT) ESTIMATION FOR COLOR GAMUT SCALABILITY

CROSS REFERENCE

This application is a continuation application of U.S. patent application Ser. No. 14/568,807, filed on Dec. 12, 2014, which claims the benefit of U.S. Provisional Application No. 61/915,892 filed on Dec. 13, 2013, the contents of which are each hereby incorporated by reference herein in their entirety.

BACKGROUND

The phase of luma and chroma sample locations of an input video stream may not be aligned. Such a misalignment of the luma and chroma sample locations may affect the precision of 3D LUT interpolation and, thus, the 3D LUT that may be estimated.

SUMMARY

Systems and/or methods for estimating color conversion components. A video coding device may receive a picture associated with a first color space. The picture may comprise a first component at a first sampling location, a second component at a second sampling location and the second component at a third sampling location. The video coding device may apply a first interpolation filter to the second component at the second sampling location and the second component at the third sampling location to determine the second component at the first sampling location. The second component at the first sampling location may be associated with the first color space. The video coding device may apply a color conversion model to the first component at the first sampling location and to the second component at the first sampling location to translate the first component at the first sampling location to a second color space. The first component may be a luma component and the second component may be a first chroma component (e.g., red difference chroma component and/or blue difference chroma component) or a second chroma component (e.g., red difference chroma component and/or blue difference chroma component). The first component may be the first chroma component (e.g., red difference chroma component and/or blue difference chroma component) or the second chroma component and the second component may be the luma component.

The video coding device may apply the first interpolation filter. The first interpolation filter may include: multiplying the second component at the second sampling location by three; adding the multiplied second component at the second sampling location, the second component at the third sampling location, and two to determine a sum; and dividing the sum by four. The first interpolation filter may include: adding the second component at the second sampling location, the second component at the third sampling location, and one to determine a sum; and dividing the sum by two.

The picture may comprises the second component at a fourth sampling location and the second component at a fifth sampling location. The video coding device may apply the first interpolation filter to the second component at the second sampling location, the second component at the third sampling location, the second component at the fourth sampling location, and the second component at the fifth sampling location to determine the second component at the first sampling location. The first interpolation filter may include: adding the second component at the second sampling location and the second component at the third sampling location to determine a first sum; adding the second component at the fourth sampling location and the second component at the fifth sampling location to determine a second sum; multiplying the second sum by three to determine a third sum; adding the first sum, the third sum, and four to determine a fourth sum; and dividing the fourth sum by eight.

The picture may comprises a third component at the second sampling location and a third component at the third sampling location. The first component may be a luma component, the second component may be a red difference chroma component, and the third component may be a blue difference chroma component. The video coding device may apply the first interpolation filter to the third component at the second sampling location and the third component at the third sampling location to determine the third component at the first sampling location. The third component at the first sampling location may be associated with the first color space. The video coding device may apply the color conversion model to the first component at the first sampling location, to the second component at the first sampling location, and to the third component at the first sampling location to translate the first component at the first sampling location to the second color space.

The picture may comprise a third component at the first sampling location. This video coding device may apply the color conversion model to the first component at the first sampling location, to the third component at the first sampling location and to the second component at the first sampling location to translate the first component at the first sampling location to the second color space. The first component may be a first chroma component, the second component may be a luma component, and the third component may be a second chroma component. The first component may be the second chroma component, the second component may be a luma component, and the third component may be the first chroma component.

The picture may be characterized by a 4:2:0 chroma format. The color conversion model may be based on a 3-dimensional look up table (LUT).

The video coding device of claim 1, wherein the processor is further configured to receive a scalable bitstream, the scalable bitstream comprising a base layer and an enhancement layer, wherein the base layer comprises the picture, the base layer is associated with the first color space and the enhancement layer is associated with the second color space.

A video coding device may receive a picture associated with a first color space. The picture may comprise a first chroma component at a first sampling location, a second chroma component at the first sampling location, a luma component at a second sampling location, a luma component at a third sampling location, a luma component at a fourth sampling location, and a luma component at a fifth sampling location. The video coding device may apply a first interpolation filter to two or more of the luma component at the second sampling location, the luma component at the third sampling location, the luma component at the fourth sampling location, and the luma component at the fifth sampling location to determine the luma component at the first sampling location, wherein the luma component at the first sampling location is associated with the first color space. The video coding device may apply a color conversion model to the first chroma component at the first sampling location, the second chroma component at the first sampling location, and to the luma component at the first sampling location to translate the first chroma component at the first sampling location to a second color space. The video coding device may apply the color conversion model to the first chroma component at the first sampling location, the second chroma component at the first sampling location, and to the luma component at the first sampling location to translate the second chroma component at the first sampling location to the second color space. The first chroma component and/or the second chroma component may be a red difference chroma component and/or a blue difference chroma component.

A video coding device may receive a picture associated with a first color space. The picture may comprise a luma component at a first sampling location, a first chroma component at a second sampling location, a second chroma component at the second sampling location, the first chroma component at a third sampling location, the second chroma component at the third sampling location, the first chroma component at a fourth sampling location, the second chroma component at the fourth sampling location, the first chroma component at a fifth sampling location, and the second chroma component at the fifth sampling location. The video coding device may apply a first interpolation filter to two or more of the first chroma component at the second sampling location, the first chroma component at the third sampling location, the first chroma component at the fourth sampling location, and the first chroma component at the fifth sampling location to determine the first chroma component at the first sampling location, wherein the first chroma component at the first sampling location is associated with the first color space. The video coding device may apply the first interpolation filter to two or more of the second chroma component at the second sampling location, the second chroma component at the third sampling location, the second chroma component at the fourth sampling location, and the second chroma component at the fifth sampling location to determine the second chroma component at the first sampling location, wherein the second chroma component at the first sampling location is associated with the first color space. The video coding device may apply a color conversion model to the luma component at the first sampling location, the first chroma component at the first sampling location, and the second chroma component at the first sampling location to translate the luma component at the first sampling location to a second color space. The first chroma component and/or the second chroma component may be a red difference chroma component and/or a blue difference chroma component.

A video coding device may be configured to receive a picture associated with a first color space. The picture may comprise a first component at a first sampling location, the first component at a second sampling location, a second component at a third sampling location, the second component at a fourth sampling location, the second component at a fifth sampling location, and the second component at a sixth sampling location. The video coding device may be configured to apply a first interpolation filter to the second component at the third sampling location and the second component at the fourth sampling location to determine the second component at the first sampling location. The second component at the first sampling location may be associated with the first color space. The video coding device may be configured to apply a second interpolation filter to the second component at the third sampling location, the second component at the fourth sampling location, the second component at the fifth sampling location and the second component at the sixth sampling location to determine the second component at the second sampling location. The second component at the second sampling location may be associated with the first color space. The video coding device may be configured to apply a color conversion model to the first component at the first sampling location and to the second component at the first sampling location to translate the first component at the first sampling location to a second color space. The video coding device may be configured to apply the color conversion model to the first component at the second sampling location and to the second component at the second sampling location to translate the first component at the second sampling location to the second color space.

BRIEF DESCRIPTION OF THE DRAWINGS

The patent or application file includes at least one drawing executed in color. Copies of this patent or patent application publication with color drawings will be provided by the Office upon request and payment of the necessary fee.

FIGS. 9A-9F are examples of tetrahedrons that may encompass an interpolating point (e.g., that may be used in 3D LUT estimation).

DETAILED DESCRIPTION

Figure 1:
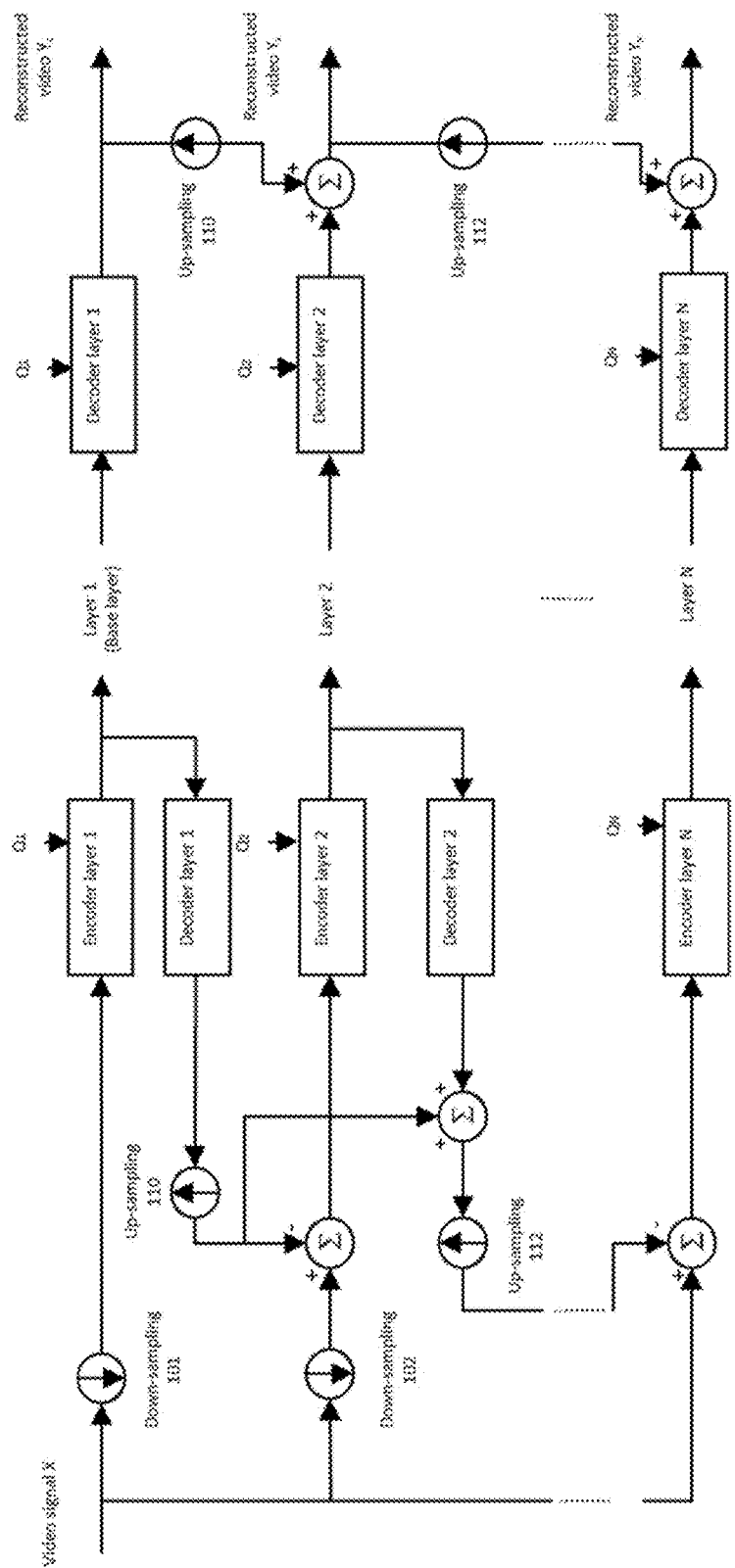
FIG. 1 is a block diagram of an example of a scalable video coding system with one or more layers such as N layers.

Digital video compression technologies may enable efficient digital video communication, distribution and consumption, such as H.261, MPEG-1, MPEG-2, H.263, MPEG-4 part2 and H.264/MPEG-4 part 10 AVC.

Compared to traditional digital video services, such as sending TV signals over satellite, cable and terrestrial transmission channels, more and more video applications, such as IPTV, video chat, mobile video, and streaming video, may be deployed in heterogeneous environments. For example, video applications may provide video streaming in networks with different size cells, and/or the like. Heterogeneity may exist on or at a client, as well as in a network. For example, on the client side, an N-screen scenario that is consuming video content on devices with varying screen sizes and display capabilities, including a smart phone, tablet, PC and TV, and/or the like may be provided and/or used. On the network side, video may be transmitted across the Internet, WiFi networks, mobile (3G and 4G) networks, and/or any combination thereof.

Scalable video coding may encode a signal once at the highest resolution. Scalable video coding may enable decoding from subsets of the streams depending on the specific rate and resolution required by certain application and/or supported by the client device. The resolution may be defined by a number of video parameters including, but not limited to, spatial resolution (e.g., picture size), temporal resolution (e.g., frame rate), video quality (e.g., subjective quality such as MOS, and/or objective quality such as PSNR or SSIM or VQM), and/or the like. Other commonly used video parameters may include a chroma format (e.g., such as YUV420 or YUV422 or YUV444), bit-depth (e.g., such as 8-bit or 10-bit video), complexity, view, gamut, and/or aspect ratio (e.g., 16:9 or 4:3). International video standards such as MPEG-2 Video, H.263, MPEG4 Visual and H.264 may have tools and/or profiles that support scalability modes.

Scalable video coding may enable the transmission and decoding of partial bitstreams. The transmission and decoding of partial bitstreams may enable a scalable video coding (SVC) system to provide video services with lower temporal and/or spatial resolutions or reduced fidelity, while retaining a relatively high reconstruction quality (e.g., given respective rates of the partial bitstreams). SVC may be implemented with single loop decoding, such that an SVC decoder may set up one motion compensation loop at a layer being decoded, and may not set up motion compensation loops at one or more other lower layers. For example, a bitstream may include two layers, including a first layer (e.g., layer 1) that may be a base layer and a second layer (e.g., layer 2) that may be an enhancement layer. When such an SVC decoder reconstructs layer 2 video, the setup of a decoded picture buffer and motion compensated prediction may be limited to layer 2. In such an implementation of SVC, respective reference pictures from lower layers may not be fully reconstructed, which may reduce computational complexity and/or memory consumption at the decoder.

Single loop decoding may be achieved by constrained inter-layer texture prediction, where, for a current block in a given layer, spatial texture prediction from a lower layer may be permitted if a corresponding lower layer block is coded in intra mode. This may be referred to as restricted intra prediction. When a lower layer block is coded in intra mode, it may be reconstructed without motion compensation operations and/or a decoded picture buffer.

SVC may implement one or more additional inter-layer prediction techniques such as motion vector prediction, residual prediction, mode prediction, etc., from one or more lower layers. This may improve rate-distortion efficiency of an enhancement layer. An SVC implementation with single loop decoding may exhibit reduced computational complexity and/or reduced memory consumption at the decoder, and may exhibit increased implementation complexity, for example, due to reliance on block-level inter-layer prediction. To compensate for a performance penalty that may be incurred by imposing a single loop decoding constraint, encoder design and computation complexity may be increased to achieve desired performance. Coding of interlaced content may not be supported by SVC.

FIG. 1 is a simplified block diagram depicting an example block-based, hybrid scalable video coding (SVC) system. A spatial and/or temporal signal resolution to be represented by the layer 1 (e.g., base layer) may be generated by downsampling of the input video signal. In a subsequent encoding stage, a setting of the quantizer such as Q1 may lead to a quality level of the base information. One or more subsequent higher layer(s) may be encoded and/or decoded using the base-layer reconstruction Y1, which may represent an approximation of higher layer resolution levels. An upsampling unit may perform upsampling of the base layer reconstruction signal to a resolution of layer-2. Downsampling and/or upsampling may be performed throughout a plurality of layers (e.g., for N layers, layers 1, 2 . . . N). Downsampling and/or upsampling ratios may be different, for example depending on a dimension of a scalability between two layers.

In the example scalable video coding system of FIG. 1, for a given higher layer n (e.g., $2 \leq n \leq N$, N being the total number of layers), a differential signal may be generated by subtracting an upsampled lower layer signal (e.g., layer n−1 signal) from a current layer n signal. This differential signal may be encoded. If respective video signals represented by two layers, n1 and n2, have the same spatial resolution, corresponding downsampling and/or upsampling operations may be bypassed. A given layer n (e.g., $1 \leq n \leq N$), or a plurality of layers, may be decoded without using decoded information from higher layers.

Relying on the coding of a residual signal (e.g., a differential signal between two layers) for layers other than the base layer, for example using the example SVC system of FIG. 1, may cause visual artifacts. Such visual artifacts may be due to, for example, quantization and/or normalization of the residual signal to restrict its dynamic range and/or quantization performed during coding of the residual. One or more higher layer encoders may adopt motion estimation and/or motion compensated prediction as respective encoding modes. Motion estimation and/or compensation in a residual signal may be different from conventional motion estimation, and may be prone to visual artifacts. In order to reduce (e.g., minimize) the occurrence of visual artifacts, a more sophisticated residual quantization may be implemented, for example along with a joint quantization process that may include both quantization and/or normalization of the residual signal to restrict its dynamic range and quantization performed during coding of the residual. Such a quantization process may increase complexity of the SVC system.

Multi-view video coding (MVC) may provide view scalability. In an example of view scalability, a base layer bitstream may be decoded to reconstruct a conventional two-dimensional (2D) video, and one or more additional enhancement layers may be decoded to reconstruct other view representations of the same video signal. When such views are combined together and displayed by a three-dimensional (3D) display, 3D video with proper depth perception may be produced.

Figure 2:
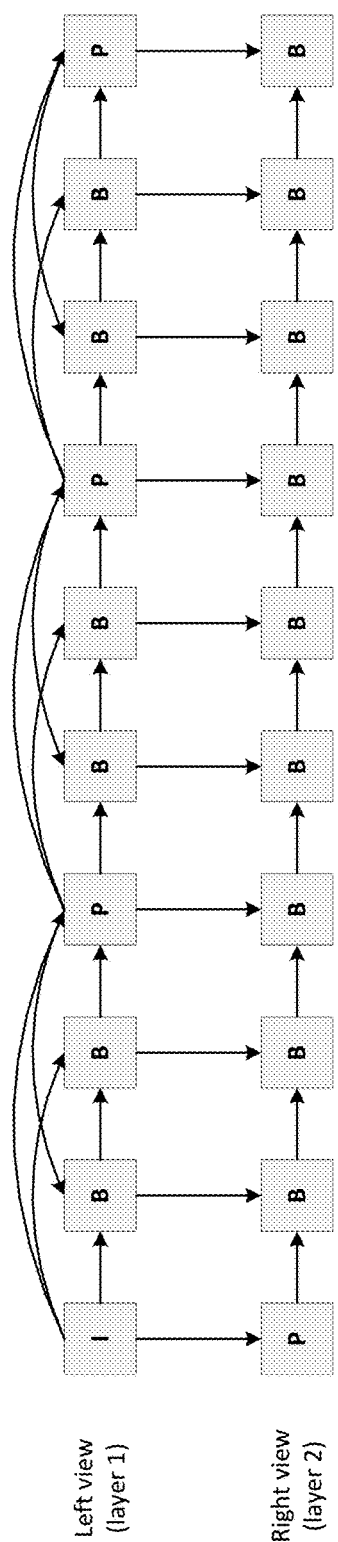
FIG. 2 is an example of temporal and/or inter-layer prediction for stereoscopic (e.g., 2-view) video coding using MVC.

FIG. 2 depicts an example prediction structure for using MVC to code a stereoscopic video with a left view (e.g., layer 1) and a right view (e.g., layer 2). The left view video may be coded with an I-B-B-P prediction structure, and the right view video may be coded with a P-B-B-B prediction structure. As shown in FIG. 2, in the right view, the first picture collocated with the first I picture in the left view may be coded as a P picture, and subsequent pictures in the right view may be coded as B pictures with a first prediction coming from temporal references in the right view, and a second prediction coming from inter-layer reference in the left view. MVC may not support the single loop decoding feature. For example, as shown in FIG. 2, decoding of the right view (e.g., layer 2) video may be conditioned on the availability of an entirety of pictures in the left view (e.g., layer 1), with one or more (e.g., each) layer (e.g., view) having a respective compensation loop. An implementation of MVC may include high level syntax changes, and may not include block-level changes. This may ease implementation of MVC. For example, MVC may be implemented by configuring reference pictures at the slice and/or picture level. MVC may support coding of more than two views, for instance by extending the example shown in FIG. 2 to perform inter-layer prediction across multiple views.

MPEG frame compatible (MFC) video coding may provide a scalable extension to 3D video coding. For example, MFC may provide a scalable extension to frame compatible base layer video (e.g., two views packed into the same frame), and may provide one or more enhancement layers to recover full resolution views. Stereoscopic 3D video may have two views, including a left and a right view. Stereoscopic 3D content may be delivered by packing and/or multiplexing the two views into one frame, and by compressing and transmitting the packed video. At a receiver side, after decoding, the frames may be unpacked and displayed as two views. Such multiplexing of the views may be performed in the temporal domain or the spatial domain. When performed in the spatial domain, in order to maintain the same picture size, the two views may be spatially downsampled (e.g., by a factor of two) and packed in accordance with one or more arrangements. For example, a side-by-side arrangement may put the downsampled left view on the left half of the picture and the downsampled right view on the right half of the picture. Other arrangements may include top-and-bottom, line-by-line, checkerboard, etc. The arrangement used to achieve frame compatible 3D video may be conveyed by one or more frame packing arrangement SEI messages, for example. Although such arrangement may achieve 3D delivery with minimal increase in bandwidth consumption, spatial downsampling may cause aliasing in the views and/or may reduce the visual quality and user experience of 3D video.

Video applications, such as IPTV, video chat, mobile video, and/or streaming video, may be deployed in heterogeneous environments. Heterogeneity may exist on the client side. Heterogeneity may exist in a network. An N-screen may comprise consuming video content on devices with varying screen sizes and/or display capabilities, including smart phones, tablets, PCs, and/or TVs. An N-screen may contribute to heterogeneity, for example, on the client side. Video may be transmitted across the Internet, WiFi networks, mobile networks (e.g., 3G and/or 4G), and/or any combination of these networks, for example, on the network side. Scalable video coding may improve the user experience and/or video quality of service. Scalable video coding may involve encoding a signal at the highest resolution. Scalable video coding may involve enabling decoding from subsets of streams, for example, depending on the available network bandwidth and/or video resolution used by certain applications and/or supported by the client device. Resolution may be characterized by a number of video parameters. Video parameters may comprise one or more of the following: spatial resolution, temporal resolution, video quality, chroma format, bit-depth, complexity, view, color gamut, and/or aspect ratio, etc. Spatial resolution may comprise picture size. Temporal resolution may comprise frame rate. Video quality may comprise subjective quality, such as MOS, and/or objective quality, such as PSNR, SSIM or VQM. Chroma format may comprise YUV420, YUV422 or YUV444, etc. Bit-depth may comprise 8-bit video, 10-bit video, etc. Aspect ratio may comprise 16:9 or 4:3, etc. HEVC scalable extension may support at least spatial scalability (e.g., the scalable bitstream may include signals at more than one spatial resolution), quality scalability (e.g., the scalable bitstream may include signals at more than one quality level), and/or standard scalability (e.g., the scalable bitstream may include a base layer coded using H.264/AVC and one or more enhancement layers coded using HEVC). In spatial scalability, the scalable bitstream may comprise signals at one or more spatial resolution. In quality scalability, the scalable bitstream may comprise signals at one or more quality levels. In standard scalability, the scalable bitstream may comprise a base layer coded using, for example, H.264/AVC, and one or more enhancement layers coded using, for example, HEVC. Quality scalability may be referred to as SNR scalability. View scalability may support 3D video applications. In view scalability, the scalable bitstream may include both 2D and 3D video signals.

A video coding system (e.g., a video coding system in accordance with scalable extensions of high efficiency video coding (SHVC)) may include one or more devices that are configured to perform video coding. A device that is configured to perform video coding (e.g., to encode and/or decode video signals) may be referred to as a video coding device. Such video coding devices may include video-capable devices, for example, a television, a digital media player, a DVD player, a Blu-Ray™ player, a networked media player device, a desktop computer, a laptop personal computer, a tablet device, a mobile phone, a video conferencing system, a hardware and/or software based video encoding system, or the like. Such video coding devices may include wireless communications network elements, such as a wireless transmit/receive unit (WTRU), a base station, a gateway, or other network elements.

Scalable enhancements of HEVC may be discussed herein. One or more targets may have been established, for example, for spatial scalability. The targets of 25% bit rate reduction for 2× spatial scalability and 50% bit rate reduction for 1.5× spatial scalability may be achieved, for example, compared to using non-scalable coding, measured for higher resolution video. Scalability may be used, for example, to broaden the use cases for scalable HEVC. Scalability may refer to the type of scalability when the base layer may be encoded with H.264/AVC, or MPEG2, while the one or more enhancement layers may be encoded using, for example, HEVC. Scalability may provide backward compatibility for legacy content that may be encoded using H.264/AVC, or MPEG2, and enhance the quality of the legacy content with one or more enhancement layers encoded with HEVC, that may provide better coding efficiency.

3D scalable video coding technique may be referred to as 3D video coding or 3DV. 3DV may be discussed herein. 3DV may develop various flavors of view scalability that may be targeted for autostereoscopic applications. Autostereoscopic displays and applications may allow or enable people to experience 3D without the cumbersome glasses. To achieve a suitable or good 3D experience without glasses, more than two views may be provided and/or used. Coding many views (e.g., such as 9 views or 10 views) may be expensive. 3DV may provide and/or use a hybrid approach of coding a few views (e.g., 2 or 3 views) with relatively large disparity together with the depth maps that may provide depth information of the views. At the display side, the coded views and depth maps may be decoded, and the remaining views may be generated using the decoded views and their depth maps using, for example, view synthesis technologies. 3DV may consider various methods to code the views and the depth maps, for example, coding the views and the depth maps using a combination of different techniques, such as H.264/AVC, MVC and HEVC, including coding the base layer with one technique (e.g., H.264/AVC) and coding one or more enhancement layers with another technique (e.g., HEVC). 3DV may provide a menu of different options from which applications may choose.

Table 1 may summarize an example of the different types of scalabilities discussed herein. At the bottom of Table 1, bit-depth scalability and chroma format scalability may be tied to video formats (e.g., higher than 8-bit video and/or chroma sampling formats higher than YUV4:2:0) used by professional video applications. Bit-depth scalability and chroma format scalability may be utilized. Aspect ratio scalability and color gamut scalability may be provided and/or used as desirable scalability (e.g., but may not be currently provided, used, and/or planned for the first phase of scalable HEVC development).

Figure 3:
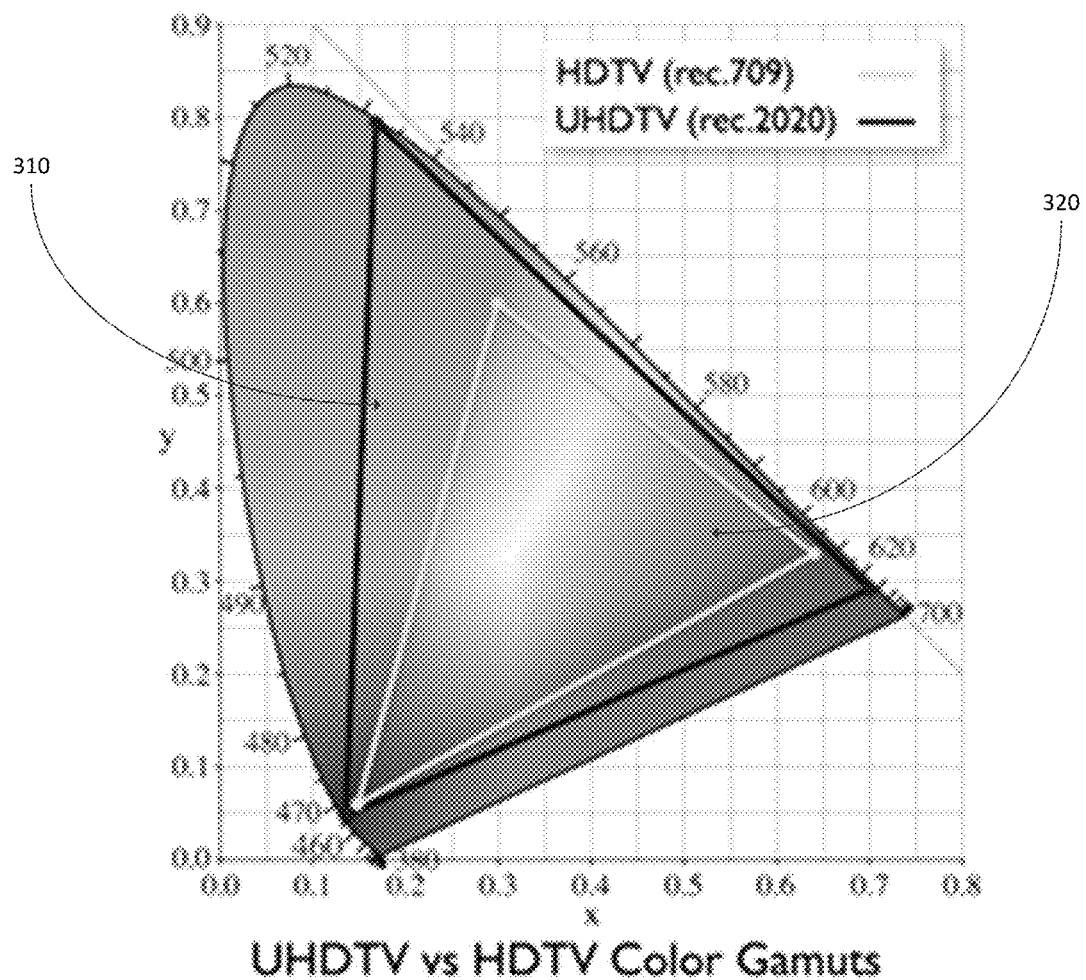
FIG. 3 is an example color primary comparison between a BT.709 (HDTV) and a BT.2020 (UHDTV) in a CIE color definition or space.

FIG. 3 illustrates a comparison between BT.709 (HDTV) and BT.2020 (UHDTV) in a CIE color definition. With advanced display technologies, ultra-high definition TV (UHDTV) may support larger resolution, larger bit-depth, higher frame-rate, and wider color gamut compared to the HDTV specification (e.g., BT.709). The user experience may be greatly improved due to the high fidelity quality that BT.2020 may provide. UHDTV may support up to 4K (3840×2160) and 8K (7680×4320) resolution, with the frame-rate being up to 120 Hz, and the bit-depth of picture samples being 10 bits or 12 bits. The color space of UHDTV 310 may be defined by BT.2020. The color space of UHDTV 320 may be defined by BT.790. The volume of colors rendered in BT.2020 310 may be broader than the volume of color space in HDTV 320 (e.g., BT.709), which may mean more visible color information may be rendered using the UHDTV specification.

TABLE 1

Examples of different types of scalabilities

| Scalability | Example |
| --- | --- |
| View scalability | 2D→3D (2 or more views) |
| Spatial scalability | 720 p→1080 p |

TABLE 1-continued

Examples of different types of scalabilities

| Scalability | Example |
| --- | --- |
| Quality (SNR) scalability | 35 dB→38 dB |
| Temporal scalability | 30 fps→60 fps |
| Standards scalability | H.264/AVC→HEVC |
| Bit-depth scalability | 8-bit video → 10-bit video |
| Chroma format scalability | YUV4:2:0→YUV4:2:2, YUV4:4:4 |
| Aspect ratio scalability | 4:3→16:9 |
| Color gamut scalability | BT.709(HDTV) -> BT.2020(UHDTV) |

Color gamut scalability. Color gamut scalable (CGS) coding may be multi-layer coding where two or more layers may have different color gamut and bit-depth. For example, as shown in Table 1, in a 2-layer scalable system, the base layer may be a HDTV color gamut as defined in BT.709 and the enhancement layer may be a UHDTV color gamut as defined in BT.2020. P3 color gamut is a color gamut that may be used. The P3 color gamut may be used in digital cinema applications. The inter-layer process in CGS coding may use color gamut conversion techniques to convert a base layer color gamut to an enhancement layer color gamut. After color gamut conversion may be applied, the inter layer reference pictures generated may be used to predict the enhancement layer pictures, for example, with better or improved accuracy.

Figure 4A:
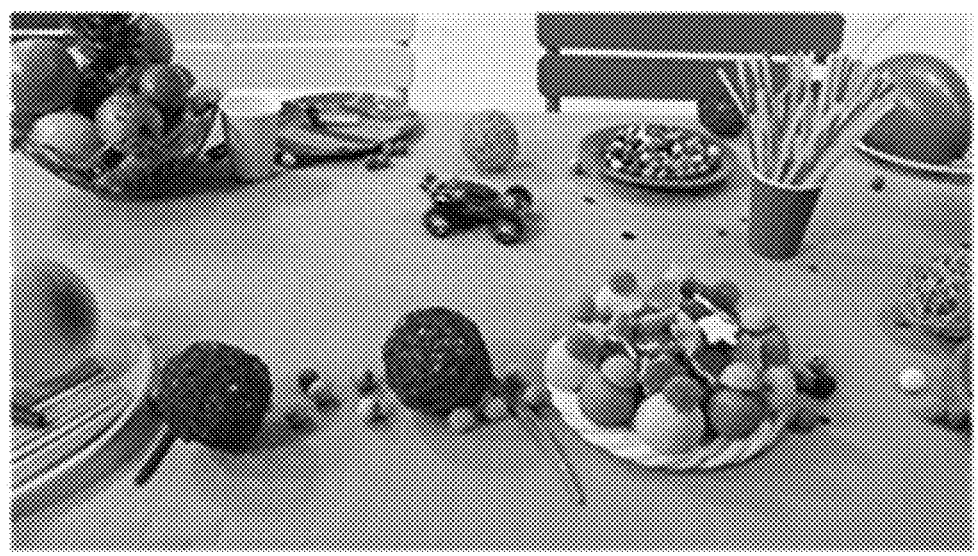
FIG. 4A is an example of a visual difference to an end user between a picture graded in BT.709 and rendered in BT.709.
Figure 4B:
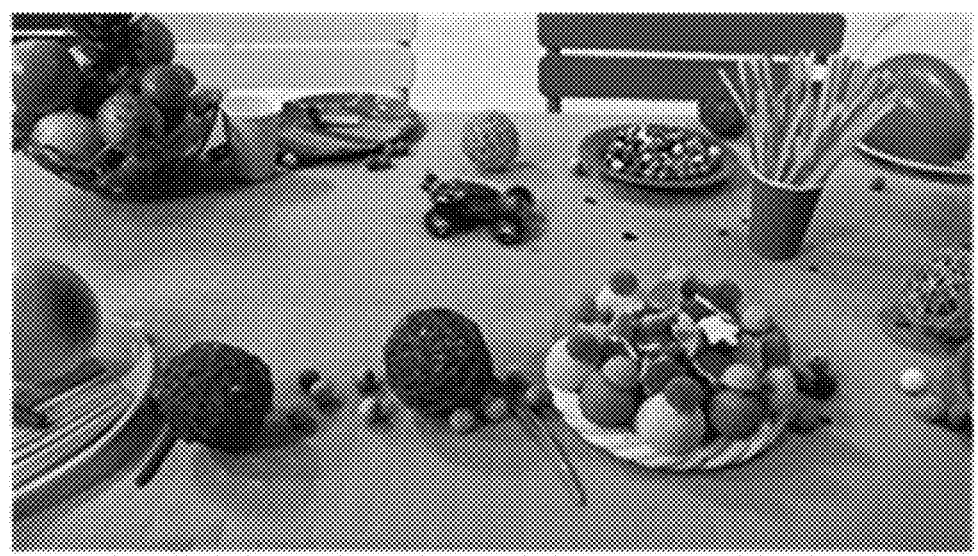
FIG. 4B is an example of a visual difference to an end user between a picture graded in BT.2020 and rendered in BT.709.

FIG. 4A and FIG. 4B may depict an example of a visual difference to the end users between the BT.709 color gamut and the BT.2020 color gamut respectively. In FIG. 4A and FIG. 4B, the same content may be color graded twice using a different color gamut. For example, the content in FIG. 4A may be color graded in BT.709 and rendered/displayed on a BT.709 display. The content in FIG. 4B may be color graded in BT.2020 and rendered/displayed on BT.709 display. As shown, the color difference between the two images may be different.

Figure 5:
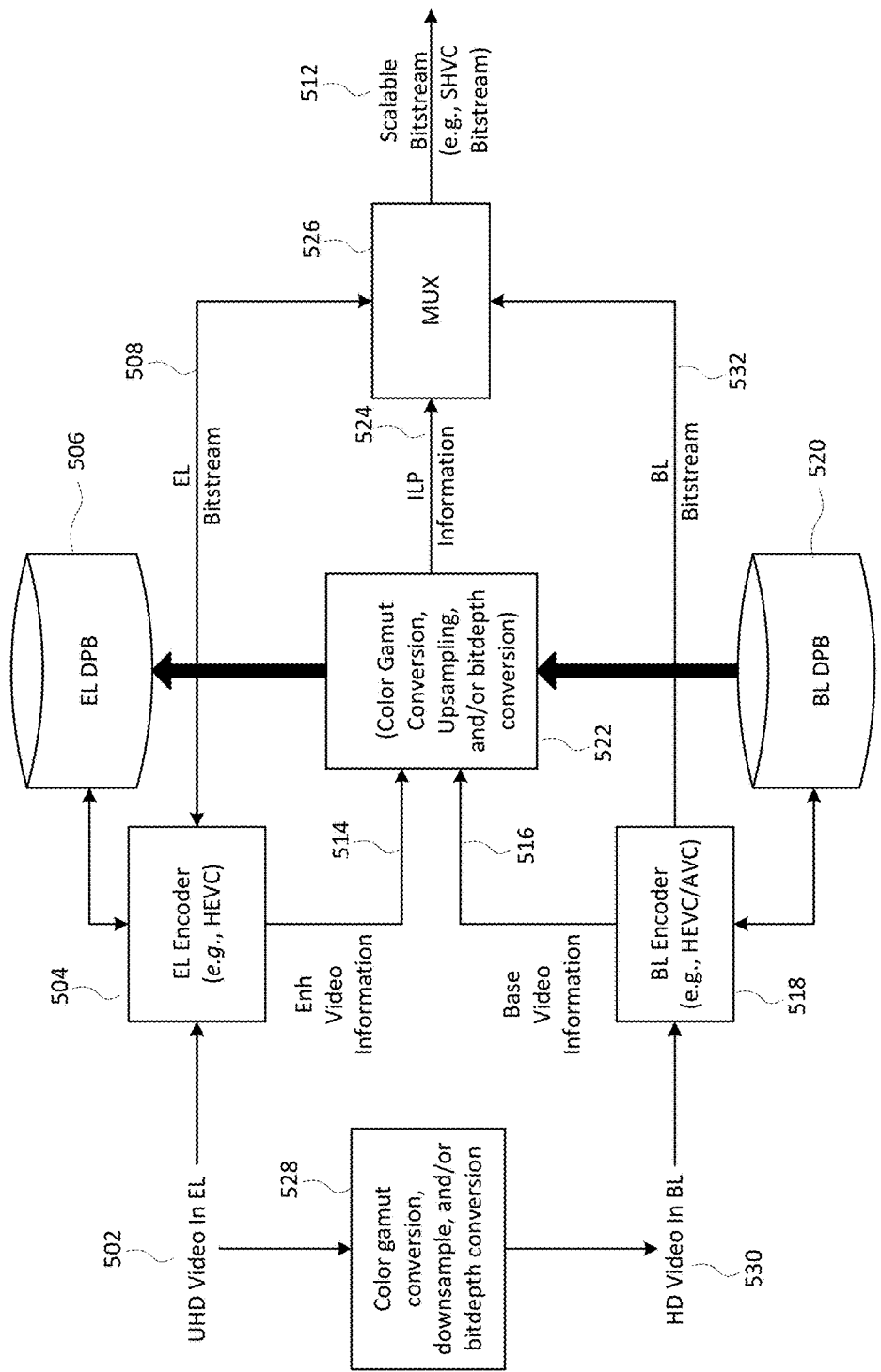
FIG. 5 is an example of color gamut scalability (CGS) coding with picture level inter-layer prediction (ILP).

FIG. 5 may illustrate an example color gamut scalability (CGS) coding with picture level interlayer prediction. In an example embodiment, FIG. 4A may be coded in the base layer and FIG. 4B may be coded in the enhancement layer. Additional inter-layer processing may be provided and/or used to improve the enhancement layer coding efficiency, for example, using the CGS coding system in FIG. 5. Color gamut conversion may be used in inter-layer processing for CGS. Through the use of color gamut conversion, the colors in BT.709 space may be translated into the BT.2020 space. The colors in BT.709 space may be used to more effectively predict enhancement layer signal in the BT.2020 space.

As shown in FIG. 5, the base layer (BL) video input 530 may be an HD video signal, and the enhancement layer (EL) video input 502 may be a UHD video signal. The HD video signal 530 and the UHD video signal 502 may correspond to each other, for example by one or more of: one or more downsampling parameters (e.g., spatial scalability); one or more color grading parameters (e.g., color gamut scalability), or one or more tone mapping parameters (e.g., bit depth scalability) 528.

The BL encoder 518 may include, for example, a high efficiency video coding (HEVC) video encoder or an H.264/AVC video encoder. The BL encoder 518 may be configured to generate the BL bitstream 532 using one or more BL reconstructed pictures (e.g., stored in the BL DPB 320) for prediction. The EL encoder 504 may include, for example, an HEVC encoder. The EL encoder 504 may include one or more high level syntax modifications, for example, to support inter-layer prediction by adding inter-layer reference pictures to the EL DPB. The EL encoder 504 may be configured to generate the EL bitstream 508 using one or more EL reconstructed pictures (e.g., stored in the EL DPB 506) for prediction.

One or more reconstructed BL pictures in the BL DPB 520 may be processed, at inter-layer processing (ILP) unit 522, using one or more picture level inter-layer processing techniques, including one or more of upsampling (e.g., for spatial scalability), color gamut conversion (e.g., for color gamut scalability), or inverse tone mapping (e.g., for bit depth scalability). The one or more processed reconstructed BL pictures may be used as reference pictures for EL coding. Inter-layer processing may be performed based on enhancement video information 514 received from the EL encoder 504 and/or the base video information 516 received from the BL encoder 518. This may improve EL coding efficiency.

At 526, the EL bitstream 508, the BL bitstream 532, and the parameters used in inter-layer processing such as ILP information 524, may be multiplexed together into a scalable bitstream 512. For example, the scalable bitstream 512 may include an SHVC bitstream.

The model parameters for color gamut conversion may be different for different content, for example, even when the BL color gamut and the EL color gamut may be fixed (e.g., BL may be in 709 and may be EL in 2020). These parameters may depend on the color grading process during post production in content generation where the colorists may apply different grading parameters to different spaces and/or different content to reflect his or her artistic intent. The input video for color grading may include high fidelity pictures. In a scalable coding system, coding of the BL pictures may introduce quantization noise. With coding structures such as the hierarchical prediction structure, the level of quantization may be adjusted per picture and/or per group of pictures. The model parameters generated from color grading may not be sufficiently accurate for coding purposes. In an embodiment, it may be more effective for the encoder to compensate the coding noise by estimating the model parameters at any point. The encoder may estimate the model parameters per picture or per groups of pictures. These model parameters, for example, generated during color grading process and/or by the encoder, may be signaled to the decoder at the sequence and/or picture level so the decoder may perform the same color gamut conversion process during inter-layer prediction.

Color gamut conversion examples may include, but are not limited to, linear or piece-wise linearc color conversions. In the film industry, a 3D Look-up Table (3D LUT) may be used for color gamut conversion from one color gamut method or technique to another. Additionally, 3D LUT for CGS coding may be provided and/or used. FIG. 5 depicts an example CGS coding scheme with picture level inter-layer prediction (ILP). The ILP includes color gamut conversion from base layer (BL) color gamut to enhancement layer (EL) color gamut, upsampling from BL spatial resolution to EL spatial resolution, and/or inverse tone mapping from BL sample bit-depth to EL sample bit-depth.

Figure 6:
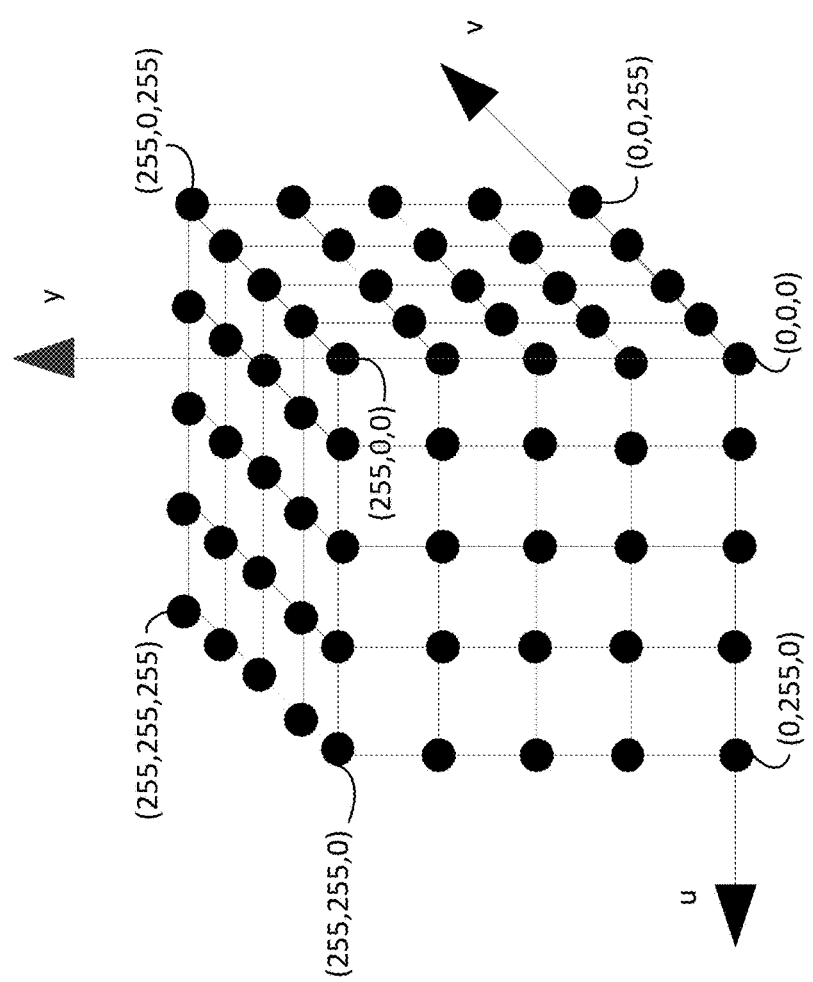
FIG. 6 is an example of a 3D look-up table for an 8-bit YUV signal.
Figure 7:
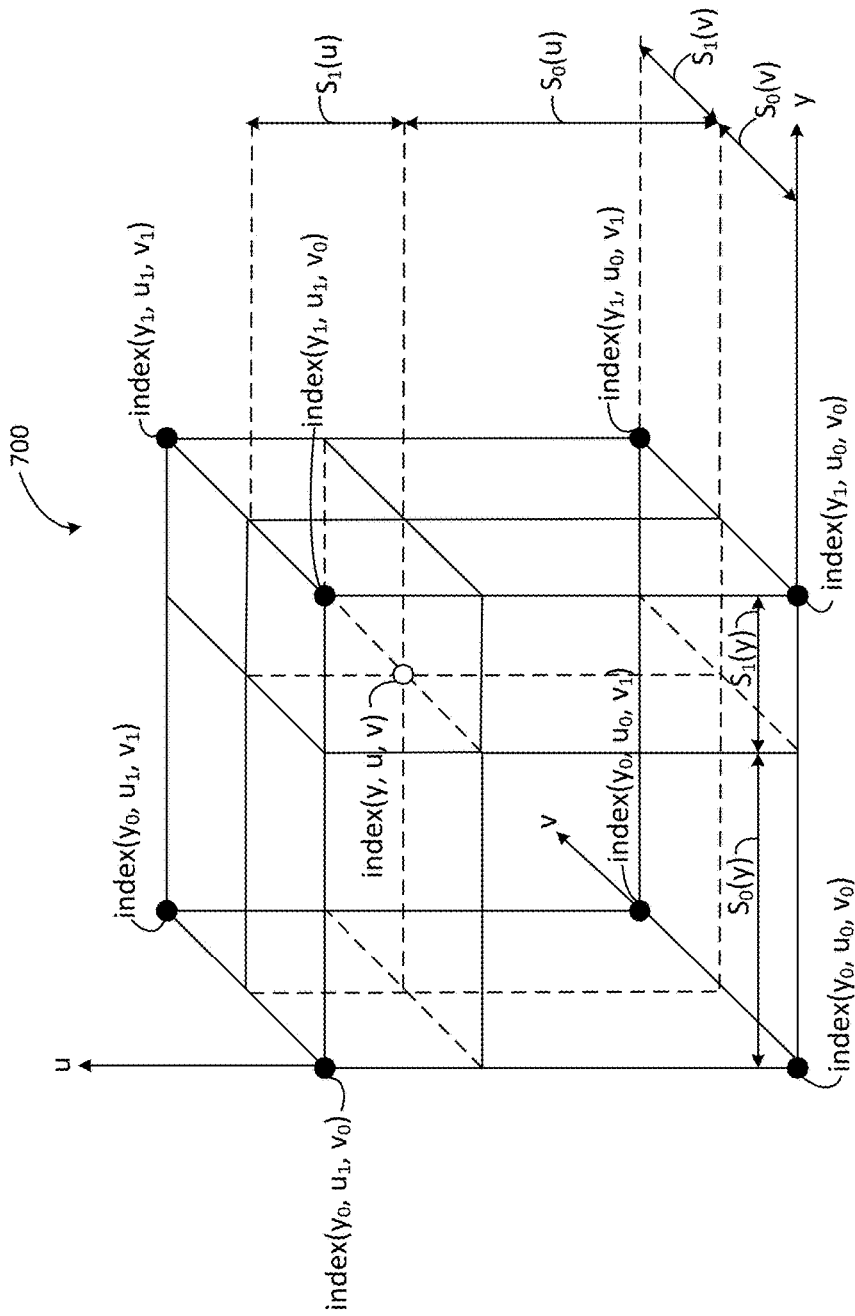
FIG. 7 is an example of a weight calculation in a tri-linear or tetrahedral interpolation (e.g., that may be used in a 3D LUT estimation).

FIG. 6 illustrates an example 3D Look-up Table for 8-bit YUV signal. FIG. 7 illustrates an example weight calculation in tri-linear or tetrahedral interpolation. As described herein, a color conversion model, such as a 3D LUT, may be used for a color gamut conversion. For example, (y, u, v) may be denoted as the sample triplet in the color gamut of the base layer, and (Y, U, V) as the triplet in EL color gamut. In 3D LUT, the range of BL color space may be segmented into equal octants, for example, as shown in FIG. 6.

The input of the 3D LUT may be (y, u, v) in the BL color gamut and the output of 3D LUT may be the mapped triplet (Y, U, V) in EL color gamut. For example, referring to FIG. 7, the input may be index (y, u, v) that resides within the octant 700. During a conversion process, if the input (y, u, v) overlaps with one of the vertices of octants, the output (Y, U, V) maybe be derived by referencing one of the 3D LUT entries directly, for example, the component (y, u, v) that overlaps its respective vertex. If the input (y, u, v) (e.g., or any one of the components of the input) lie inside an octant (e.g., but not on one of its vertices), such as the index (y, u, v) of FIG. 7, an interpolation process may be applied. For example, trilinear and/or tetrahedral interpolations and methods for performing the same may be applied. Trialinear-interpolation may be applied with its nearest 8 vertices, for example, as shown in FIG. 7. The trilinear-interpolation may be carried out using one or more of the following equations:

$$Y = K \times \sum_{i=0,1} \sum_{j=0,1} \sum_{k=0,1} s_i(y) \times s_j(u) \times s_k(v) \times LUT[y_i][u_j][v_k] \cdot Y \quad (1)$$

$$U = K \times \sum_{i=0,1} \sum_{j=0,1} \sum_{k=0,1} s_i(y) \times s_j(u) \times s_k(v) \times LUT[y_i][u_j][v_k] \cdot U \quad (2)$$

$$V = \quad (3)$$
$$K \times \sum_{i=0,1} \sum_{j=0,1} \sum_{k=0,1} s_i(y) \times s_j(u) \times s_k(v) \times LUT[y_i][u_j][v_k] \cdot V$$

$$K = \frac{1}{(y_1 - y_0) \times (u_1 - u_0) \times (v_1 - v_0)}$$

Referring to Equations (1)-(3) and FIG. 7, for example, $(y_i, u_j, v_k)$ may represent the vertices of the BL color gamut (i.e., inputs to 3D LUT). $LUT[y_i][u_j][v_k]$ may represent the vertices of the EL color gamut (i.e., outputs of 3D LUT at the entry $(y_i, u_j, v_k)$). $LUT[y_i][u_j][v_k]$. Y, $LUT[y_i][u_j][v_k]$. U, $LUT[y_i][u_j][v_k]$. V may represent the Y, U, and V components of the vertex $LUT[y_i][u_j][v_k]$, respectively. i,j,k={0, 1}, and $s_0(y)=y_1-y, s_1(y)=y-y_0, s_0(u)=u_1-u, s_1(u)=u-u_0, s_0(v)=v_1-v, s_1(v)=v-v_0$ may be the weights that are applied, for example, as shown in FIG. 7.

Figure 8:
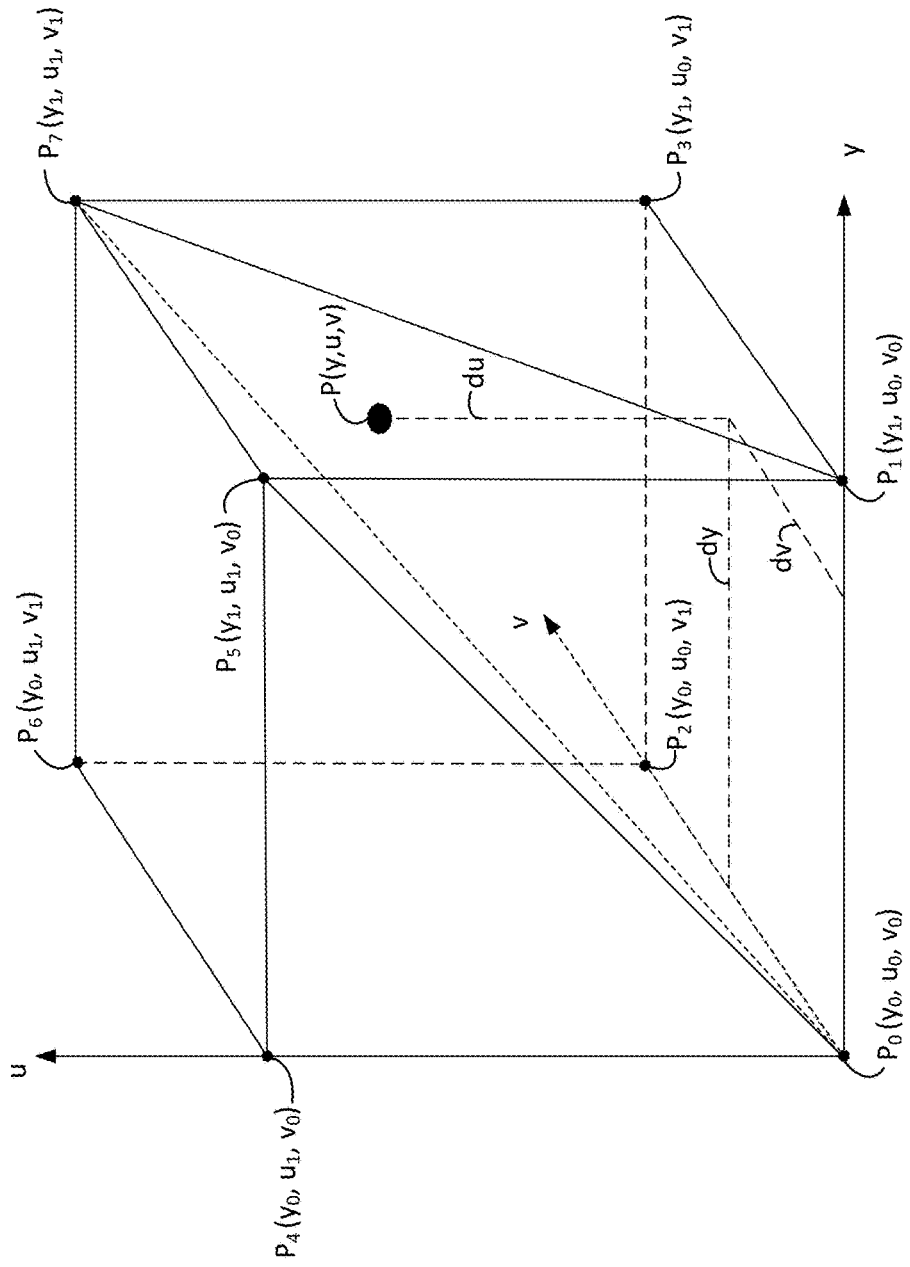
FIG. 8 is an example of a tetrahedral interpolation (e.g., that may be used in a 3D LUT estimation).

FIG. 8 illustrates an example tetrahedral interpolation. FIG. 9A, FIG. 9B, FIG. 9C, FIG. 9D, FIG. 9E and FIG. 9F illustrate types of tetrahedrons to encompass an interpolating point. Tetrahedral interpolation may use four vertices of the tetrahedron including a point, P(y, u, v), to be interpolated for calculation. The input point P (i.e., P(y, u, v)) in FIG. 8 may be enclosed inside the tetrahedron whose vertices may be P0, P1, P5, P7. The tetrahedral interpolation may be calculated in Equation (4)(5)(6) for each component. There may be six possible choices of the tetrahedron that may comprise the point P to be interpolated. FIGS. 9A-9F may show or list the six possible cases. In an example, the vertices P0 and P7 may be included in the tetrahedron.

$$Y = \quad (4)$$
$$T_y \times ((y1 - y0) \times LUT[P_0] \cdot Y + dy \times (LUT[P_1] \cdot Y - LUT[P_0] \cdot Y)) +$$
$$T_u \times du \times (LUT[P_5] \cdot Y - LUT[P_1] \cdot Y) +$$
$$T_v \times dv \times (LUT[P_7] \cdot Y - LUT[P_5] \cdot Y)$$

$$U = \quad (5)$$
$$T_y \times ((y1 - y0) \times LUT[P_0] \cdot U + dy \times (LUT[P_1] \cdot U - LUT[P_0] \cdot U)) +$$
$$T_u \times du \times (LUT[P_5] \cdot U - LUT[P_1] \cdot U) +$$
$$T_v \times dv \times (LUT[P_7] \cdot U - LUT[P_5] \cdot U)$$

-continued $$V = T_y \times \\ ((y1 - y0) \times LUT[P_0] \cdot V + dy \times (LUT[P_1] \cdot V - LUT[P_0] \cdot V)) + \\ T_u \times du \times (LUT[P_5] \cdot V - LUT[P_1] \cdot V) + \\ T_v \times dv \times (LUT[P_7] \cdot V - LUT[P_5] \cdot V)$$ (6)

$$T_y = \frac{1}{(y_1 - y_0)}, T_u = \frac{1}{(u_1 - u_0)}, T_v = \frac{1}{(v_1 - v_0)}$$

3D LUT may be estimated by the encoder, for example, using an original signal in one color space and the corresponding signal in another color space. For example, a Least Square (LS) estimation method may be used to estimate a 3D LUT, for example, if a 3D LUT interpolation technique or process is linear. A gradient descent based iterative technique may be used for estimation. As described herein, a 3D LUT estimation may be performed with a LS estimation method.

There may be challenges for 3D LUT estimation with LS. For example, the scale of 3D LUT parameters that may be estimated may be large. In FIG. 6, the sample bit-depth may be 8 bits. If the unit octant size is 16×16×16, there may be 17×17×17 entries in the 3D LUT table. One or more (e.g., each) entry of the 3D LUT may comprise three components. There may be 4913 (17×17×17) unknown parameters of each component. Such a large scale linear system estimation may use a large amount of memory and may invoke a large number of computations.

The 3D LUT may not be fully used for color gamut conversion of a given video input. For example, in a statistical analysis of one or more test sequences used in core experiments of color gamut scalability, a percentage of used entries in 3D LUT may be less than 20%. In such an embodiment, a LS estimation method may not be able to be directly applied because there may be one or more entries that may not be measured.

A distribution of BL pixels may not be even in a 3D color space. For example, such BL pixels may cluster around some colors (e.g., major colors) and may be distributed sparsely around other colors. This unbalanced characteristic may be related to a stability of the LS estimation as may be described herein.

Figure 10:
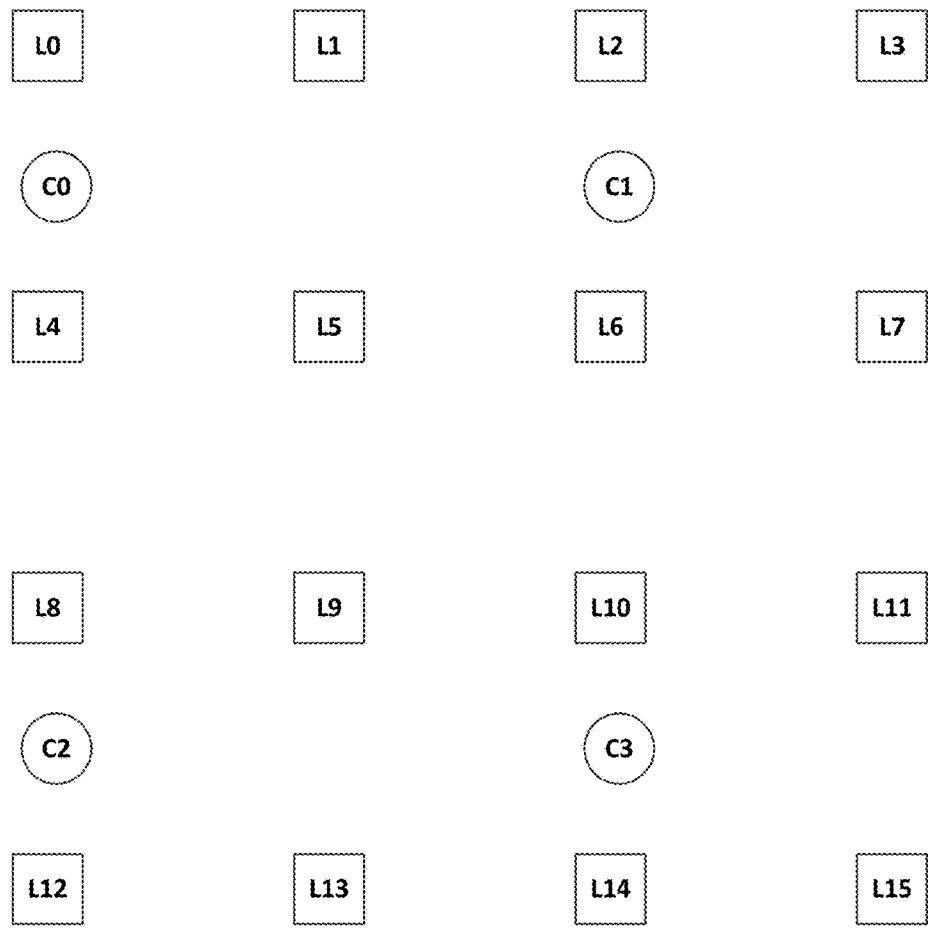
FIG. 10 is an example of a phase shift between a luma and chroma component for a chroma format (e.g., for a 420 chroma format) where a square may represent a luma pixel grid and a circle may represent a chroma grid.

FIG. 10 illustrates an example of the luma and chroma sample locations of a YUV 4:2:0 video. A phase of luma and chroma of an input video may not be aligned. To estimate and to apply a 3D LUT for one or more (e.g., each) component, the triplet formed by three components may be used. A triplet may refer to a luma component and two chroma components that are at the same sampling location (e.g., a luma component, a red difference chroma component, and a blue difference chroma component at the same sampling location). The misalignment of the luma and chroma sample locations may affect the precision of 3D LUT interpolation.

To address one or more of such challenges, systems and/or methods may be provided to improve 3D LUT estimation. For example, a BT.709 to BT.2020 color gamut conversion may be described herein. For example, the input signal in 3D LUT estimation may be the BT.709 compressed/uncompressed video, and the output signal may be BT.2020 video (e.g., which may be the training reference or target). Equation (7) may be used to describe the color gamut conversion process with 3D LUT.

$$z_i(c) = f_{P(c)}(x_i), i \in [0, N-1]$$ (7)

where x may denote an input signal in the form of triplet (y,u,v) in BT.709. z(c) may be the output signal of component c where c may be Y, U or V in BT.2020. P(c) may be the parameters of component c to be estimated. P(c) may be the 3D LUT output of component c. $f_{P(c)}$ may be the interpolation function. $f_{P(c)}$ may be a linear function, such as trilinear or tetrahedral as described herein. i may be the index of input pixel. N may be the total number of input pixels. Rewriten in the form of matrices it may be as follows:

$$z_i(c) = \vec{w}_{i,i}(c) * P(c), i \in [0, N-1]$$ (8)

where * in Equation(8) may be matrix multiplication. $\vec{w}_{i,i}(c)$ may be the weighting vector for the i-th input pixel. $w_{i,j}$ may be the weight of the j-th output entry of 3D LUT for the i-th input pixel. In an example, $w_{i,j}$ may be calculated according to Equation (1)-(3) for trilinear interpolation and Equation (4)-(6) for tetrahedral interpolation. The weighting vector may be as follows in an example:

$$\vec{w}_{i,i}(c) = [w_{i,0} \ldots w_{i,M-1}], i \in [0, N-1]$$

P(c) may be the parameter vector to be estimated, which may be the output entries of 3D LUT, and may be as follows:

$$P(c) = [p_0 \ldots p_{M-1}]$$

M may be the number of 3D LUT output entries. For example M may be 4913 for 17×17×17 sized 3D LUT. In an example, the component c may be omitted in the following equations as the 3D LUT of one or more (e.g., each) component may be estimated independently. Aggregating Equation (8) for one or more (e.g., all) pixels, the following may be defined or provided:

$$Z = W * P$$ (9)
$$Z = [z_0 \ldots z_{N-1}]^T$$

$$W = \begin{bmatrix} w_{0,0} & w_{0,1} & \ldots & w_{0,M-1} \\ \vdots & \vdots & \ddots & \vdots \\ w_{N-1,0} & w_{N-1,1} & \ldots & w_{N-1,M-1} \end{bmatrix}$$ (10)

With Least Square estimation, the solution may be as follows:

$$P = H^{-1} * (W^T * Z)$$ (11)

$$H = (W^T * W)$$ (12)

where H may be the auto-correlation matrix.

3D LUT estimation may be described herein. For example, for an input video signal such as BT.709, 3D LUT entries (e.g., 20% of 3D LUT entries) may be used in color conversion with 3D LUT. This may mean the matrix W in Equation (10) may be sparse and one or more of its elements may be zeros. An auto-correlation matrix H may be defined in Equation (12). The auto-correlation matrix H may be sparse. The auto-correlation matrix H may not be inversible. The solution in Equation (11) may not be available for the auto-correlation matrix H. In an example, the matrix W may be compacted by considering referenced entries of 3D LUT. To compact the matrix, the input pixels (y,u,v) of the input video may be scanned. The 3D LUT vertices may be masked, for example, if the vertices may be used in a 3D LUT interpolation process. The compact parameter set P' may be determined, calculated, or generated by removing the unused vertices. A mapping from P' to P that may be used to reconstruct P after P' may be estimated and/or built, for example, as $$P' = \text{compact}(P)$$

W' and H' may be calculated using the compacted P', for example, where unused vertices may have been removed. The solution may be defined as:

$$P'=H'^{-1}*(W'^T*Z) \quad (13)$$

$$H'=(W'^T*W') \quad (14)$$

3D LUT estimation may reduce the sparsity of the matrix W. The memory that may be used to store the auto-correlation matrix H for the 3D LUT estimation may be reduced, for example, after compaction since the size of H' may be smaller than H.

As described herein, a color distribution of an input video may not be even. For example, pixels may have similar colors. Colors with high occurrence rates may be major colors. This may cause an unbalance problem with W'. For example, elements in W' may correspond to major colors may have large values. Other elements in W' may correspond to colors that may not occur often (e.g., relatively often or rarely) may have low or smaller values. The result may be that the dynamic range of elements in the auto correlation matrix H' may be large, which may cause the inversion process of H' to become unstable. The estimation of P' may become unstable. To reduce such a problem, a constraint may be provided and/or used to establish a trade-off between accurate estimation results and stability of the estimation process. For example, $$H'=(W'^T*W')+\lambda I, \lambda \geq 0 \quad (15)$$

where I may be a unary matrix, and λ may be the factor to balance between the estimation accuracy and stability of the process. A larger λ may mean more bias may be put on the stability of the method or process. The value of λ may be determined based on the extent of unbalance in W'.

The original parameter vector P may be obtained by mapping the estimated vertices from P' to P, for example, after the compact parameter vector P' may be estimated. For example, $$P=\text{decompact}(P') \quad (16)$$

The unused vertices in P may be filled using the corresponding vertices in P', for example, using the interpolation process (e.g., trilinear or tetrahedral) in 3D LUT coding.

As described herein, FIG. 10 illustrates the phase shift between luma and chroma components for 4:2:0 chroma format. A luma and chroma phase alignment in 3D LUT estimation may be described herein. For example, from trilinear interpolation in Equations (1)-(3) or tetrahedral interpolation in Equations (4)-(6), a 3D LUT interpolation for one or more (e.g., each) output component may use three input components of an input signal.

As shown in FIG. 10 and described herein, in an example, the luma component sampling locations and chroma component sampling locations may not be aligned. FIG. 10 may depict a 4:2:0 chroma format. Although the component conversion may be described with respect to FIG. 10 and/or a 4:2:0 chroma format, the examples described herein may be utilized for a 4:1:0 chroma format, a 4:2:2:0 chroma format, a 4:4:4 chroma format, etc. Although FIG. 10 is described with reference to the YCbCr format, other color formats may be used.

In FIG. 10, sample locations L0-L15 may indicate sampling locations of a luma component. In FIG. 10, L may indicate a luma component and the number (e.g., 0-15) may indicate the sampling location. Sampling locations C0-C3 may indicate sampling locations of one or more (e.g., two) overlapping chroma components (e.g., a red difference chroma component and a blue difference chroma component). In FIG. 10, C may indicate one or more (e.g., two) overlapping chroma components (e.g., a red difference chroma component and a blue difference chroma component) and the number (e.g, 0-3) may indicate the sampling location.

FIG. 10 may be a grid with an x- and y-axes, where the x-axis may be a horizontal axis and the y-axis may be a vertical axis. The luma component at sampling locations L0-L15 may have an x coordinate and a y coordinate. The one or more (e.g., two) overlapping chroma components (e.g., a red difference chroma component and a blue difference chroma component) at sampling locations C0-C3 may have an x coordinate and a y coordinate.

Misalignment of sampling locations may reduce the accuracy of 3D LUT estimation. For example as shown in FIG. 10, the luma component sampling locations, L0-L15, do not overlap the chroma component sampling locations, C0-C3. Misalignment of sampling locations may be present in chroma formats, such as 4:2:0 or 4:2:2, where the chroma components are subsampled in both directions (e.g., 4:2:0, in which there are one red difference chroma component sample and one blue difference chroma component sample for every four luma components) or in the horizontal direction (e.g. 4:2:2). As a result of the chroma subsampling process, the sample positions of the luma and the chroma positions may become misaligned.

For luma component interpolation, a plurality of sampling locations of one or more chroma components (e.g., a red difference chroma component and/or blue difference chroma component) may be used to align the chroma components to the luma component sample location. For a chroma component interpolation, one or more sampling locations of the luma component may be used to align the luma component to the chroma component sampling location. Once aligned, a color component conversion model, such as a 3D LUT, may be used to translate a component (e.g., luma or chroma) from one color space to another. Translating a component from one color space to another color space may be determining the component in the second color space, for example, using the component in the first color space (e.g., at a particular sampling location).

The video coding device may receive a scalable bitstream. The scalable bitstream may comprise a base layer and an enhancement layer. The base layer may comprise the picture and the base layer may be associated with the first color space. The enhancement layer may be associated with the second color space.

The input for 3D LUT conversion may signal components (e.g., (y, u, v)) in one color space (e.g., BT.709), and the output of 3D LUT conversion may be the components (e.g., (Y, U, V)) in another color space (e.g., BT. 2020). For chroma component conversion, the luma component y may be adjusted to y' to align to the chroma component sampling location. The interpolation filter may be Equations (17)-(18). The input for 3D LUT conversion of chroma component may be (y', u, v), and the output may be U or V. The interpolation filter may be a 2-tap filter [1, 1], a 4-tap filter, and/or the like.

A video coding device may receive a picture associated with a first color space. The picture may comprise a first chroma component at a first sampling location, a second chroma component at the first sampling location, a luma component at a second sampling location, a luma component at a third sampling location, a luma component at a fourth sampling location, and a luma component at a fifth sampling location. The video coding device may apply a first interpolation filter to two or more of the luma component at the second sampling location, the luma component at the third sampling location, the luma component at the fourth sampling location, and the luma component at the fifth sampling location to determine the luma component at the first sampling location, wherein the luma component at the first sampling location is associated with the first color space. The video coding device may apply a color conversion model to the first chroma component at the first sampling location, the second chroma component at the first sampling location, and to the luma component at the first sampling location to translate the first chroma component at the first sampling location to a second color space. The video coding device may apply the color conversion model to the first chroma component at the first sampling location, the second chroma component at the first sampling location, and to the luma component at the first sampling location to translate the second chroma component at the first sampling location to the second color space. The first chroma component and/or the second chroma component may be a red difference chroma component and/or a blue difference chroma component, for example, if the YCbCr format is used. The first chroma component and/or the second chroma component may be a green difference chroma component and/or an orange difference chrom component, for example, if the YCgCo format is used. It should be noted that the descriptions herein may be applicable to color spaces represented in other formats.

As shown in FIG. 10, for example, one or more interpolation filters (e.g., those shown in Equations (17)-(18)) may be used to align the luma component to the sampling location of a misaligned chroma component. Once aligned, a conversion model, such as a 3D LUT, may be used to convert the chroma component from a first color space to a second color space. The input for 3D LUT conversion of a chroma component may be (y', u, v), for example if the chroma components have the same sampling locations, and where y' is the adjusted luma component (e.g., the luma component at the sampling location that overlaps with the sampling location of the chroma components u, v). The components (y', u, v) may be associated with the first color space. The output of the 3D LUT may be U or V, which may refer to a chroma component, U or V, in the second color space.

Interpolation filters, (e.g., those shown in Equations (17)-(18)) may be used to align the luma component to the sampling location of the chroma component such that the conversion model may be used. For example, the luma component at a sampling location of a chroma component (e.g., sampling location C0) may be determined by applying an interpolation filter using the luma component at two or more luma sampling locations (e.g., sampling locations L0, L1, L4, and/or L5), for example, as described with reference to Equations (17)-(18). The sampling location of a chroma component may comprise two or more chroma components, for example, a red difference chroma component Cr0 and corresponding blue difference chroma component Cb0). The luma component at the sampling location C0 and chroma components at the sampling location C0 may be used to translate the chroma component at the location C0 from a first color space to a second color space.

For example, as discussed herein, when converting a chroma component from one color space to another, the value of the luma component at the chroma component sampling location may be determined. To determine value of the luma component at a sampling location of a chroma component (e.g., sampling location C0), a video coding device may use a four-tap interpolation filter or a two-tap interpolation filter. The video coding device may determine which interpolation filter to use based on the sampling location of the chroma component on the x-y axis in FIG. 10. For example, the video coding device may determine the x and y components of the chroma component at a sampling location. The video coding device may then divide the x coordinate of the chroma component sampling location by two, and the video coding device may divide they coordinate of the chroma component sampling location by two. If the remainder of the division of the x coordinate by two is one, and the remainder of the division of the y coordinate by two is one, the video coding device may utilize the interpolation filter in Equation (17) or Equation (18) to determine the luma component at a sampling location of a chroma component. If the remainder of the division of the x coordinate by two is zero, and the remainder of the division of the y coordinate by two is one, the video coding device may utilize the interpolation filter in Equation (17) or Equation (18) to determine the luma component at a sampling location of a chroma component. If the remainder of the division of the x coordinate by two is one, and the remainder of the division of the y coordinate by two is zero, the video coding device may utilize the interpolation filter in Equation (17) or Equation (18) to determine the luma component at a sampling location of a chroma component. If the remainder of the division of the x coordinate by two is zero, and the remainder of the division of they coordinate by two is zero, the video coding device may utilize the interpolation filter in Equation (17) or Equation (18) to determine the luma component at a sampling location of a chroma component. A video coding device may use Equations (17)-(18) interchangeably to determine the value (e.g., align) the luma component at a sampling location of a chroma component.

For example, the luma component at the sampling location C0 may be determined using a four-tap filter, for example, as shown in Equation (17):

$$L(C0)=((L0+L4)*3+(L1+L5)+4)>>3 \quad (17)$$

where >>3 may mean the sum of ((L0+L4)*3+(L1+L5)+4) is divided by $2^3$ and/or >>3 is calculated using right shift by three. If the sum of ((L0+L4)*3+(L1+L5)+4) is not an integer, the decimal may be disregarded prior to dividing the sum by $2^3$. In Equation 17, to determine the luma component at the sampling location C0, a video coding device may apply an interpolation filter in which the luma component at sampling location L0 is added to the luma component at a different sampling location L4 to determine a sum. The video coding device may then multiply the sum by three, and add the multiplied sum to the luma component at sampling location L1, the luma component at sampling location L5 and four to determine a final sum. An integer sum of the final sum may be determined. The video coding device may then divide this integer sum by 8 to determine the luma component at the sampling location C0. The luma component at the sampling locations C1, C2, and C3 may be determined using Equation 17 with the appropriate luma components.

The luma component at the sampling location C0 may be determined using a two-tap filter. An example of a two-tap filter that may be used is provide in Equation (18):

$$L(C0)=(L0+L4+1)>>1 \quad (18)$$

where >>1 may mean the sum of (L0+L4+1) is divided by $2^1$ and/or >>1 is calculated using right shift by one. If the sum of (L0+L4+1) is not an integer, the decimal may be disregarded prior to dividing the sum by $2^1$. In Equation 18, to determine the luma component for the sampling location C0, a video coding device may apply a two-tap interpolation filter in which the luma component at a sampling location L0 is added to the luma component at a different sampling location L4 and one to determine a sum. An integer sum of the final sum may be determined. The video coding device may then divide the integer value of the sum by two to determine the luma component at the sampling location C0. The luma component at the sampling locations C1, C2, and C3 may be determined using Equation 18 with the appropriate luma components.

The video coding device may translate (e.g., determine) a chroma component at the sampling location C0 in a second color space using the luma component at the sampling location C0 in the first color space and both of the chroma components at the sampling location C0 in the first color space using a conversion model, for example, a 3D LUT as described herein. As noted, the luma component at the sampling location C0 may be determined using an interpolation filter, for example, as shown in Equation (17) or (18).

A video coding device may receive a picture associated with a first color space. The picture may comprise a luma component at a first sampling location, a first chroma component at a second sampling location, a second chroma component at the second sampling location, the first chroma component at a third sampling location, the second chroma component at the third sampling location, the first chroma component at a fourth sampling location, the second chroma component at the fourth sampling location, the first chroma component at a fifth sampling location, and the second chroma component at the fifth sampling location. The video coding device may apply an interpolation filter to two or more of the first chroma component at the second sampling location, the first chroma component at the third sampling location, the first chroma component at the fourth sampling location, and the first chroma component at the fifth sampling location to determine the first chroma component at the first sampling location, wherein the first chroma component at the first sampling location is associated with the first color space. The video coding device may apply the interpolation filter to two or more of the second chroma component at the second sampling location, the second chroma component at the third sampling location, the second chroma component at the fourth sampling location, and the second chroma component at the fifth sampling location to determine the second chroma component at the first sampling location, wherein the second chroma component at the first sampling location is associated with the first color space. The video coding device may apply a color conversion model to the luma component at the first sampling location, the first chroma component at the first sampling location, and the second chroma component at the first sampling location to translate the luma component at the first sampling location to a second color space. The first chroma component and/or the second chroma component may be a red difference chroma component and/or a blue difference chroma component As shown in FIG. 10, for example, one or more interpolation filters (e.g., those shown in Equations (19)-(22)) may be used to align one or more chroma components to the sampling location of a misaligned luma component. Once aligned, a conversion model, such as a 3D LUT, may be used to convert the luma component from a first color space to a second color space. The input for 3D LUT conversion for the luma component may be (y, u', v'), where u' and v' are the adjusted chroma components (e.g., the chroma components at the sampling location that overlaps with the sampling location of the luma component y). The components (y, u', v') may be associated with the first color space. The output of the 3D LUT is Y, which may refer to the luma component in the second color space.

Interpolation filters (e.g., those shown in Equations (19)-(22)) may be used to align a chroma component to the sampling location of the luma component such that the conversion model may be used. For example, a chroma component at a sampling location of a luma component (e.g., sampling location L4, L5, L8, and/or L9) may be determine by applying a resampling filter using the chroma component at two or more sampling locations (e.g., sampling locations C0, C1, C2, and/or C3). As such, a resampled value of a component (e.g., a value of the component at a different sampling location) may be determined using the component at a plurality of other sampling locations. For example, the luma component at the sampling locations L4, L5, L8, and/or L9 in FIG. 10 may be interpolated using a 3D LUT. To interpolate the luma component at the sampling locations L4, L5, L8, and/or L9, chroma components (e.g., u, v) at the sampling locations L4, L5, L8, and/or L9 may be determined. The chroma components at the sampling locations L4, L5, L8, and L9 may be derived using one or more resampling filters (e.g., Equations (19)-(22)), for example, as described herein. The luma component at the sampling location L4, L5, L8, and/or L9 and chroma components at the sampling location L4, L5, L8, and/or L9 may be used to translate the luma component at the location L4, L5, L8, and/or L9 from a first color space to a second color space.

For example, as discussed herein, when converting a luma component from one color space to another, the value of the chroma component (e.g., the red difference chroma component and/or the blue difference chroma component) at the luma component sampling location may be determined. To determine value of the chroma component at a sampling location of a luma component (e.g., sampling location L0, L1, L4, L5 ), a video coding device may use a four-tap interpolation filter or a two-tap interpolation filter. The video coding device may determine which interpolation filter to use based on the sampling location of the luma component on the x-y axis in FIG. 10. For example, the video coding device may determine the x and y components of the luma component at a sampling location. The video coding device may then divide the x coordinate of the luma component sampling location by two, and the video coding device may divide the y coordinate of the luma component sampling location by two. If the remainder of the division of the x coordinate by two is zero, and the remainder of the division of the y coordinate by two is one, the video coding device may utilize the interpolation filter in Equation (19) to determine the chroma component (e.g., red difference chroma component and/or blue difference chroma component) at a sampling location of a luma component. As shown in FIG. 10, Equation (19) may be utilized to determine the chroma component (e.g., red difference chroma component and/or blue difference chroma component) at the luma component sampling locations L4, L6, L12 and L14. If the remainder of the division of the x coordinate by two is one, and the remainder of the division of the y coordinate by two is one, the video coding device may utilize the interpolation filter in Equation (20) to determine the chroma component (e.g., red difference chroma component and/or blue difference chroma component) at a sampling location of a luma component. As shown in FIG. 10, Equation (20) may be utilized to determine the chroma component (e.g., red difference chroma component and/or blue difference chroma component) at the luma component sampling locations L5, L7, L13 and L15. If the remainder of the division of the x coordinate by two is zero, and the remainder of the division of the y coordinate by two is zero, the video coding device may utilize the interpolation filter in Equation (21) to determine the chroma component (e.g., red difference chroma component and/or blue difference chroma component) at a sampling location of a luma component. As shown in FIG. 10, Equation (21) may be utilized to determine the chroma component (e.g., red difference chroma component and/or blue difference chroma component) at the luma component sampling locations L0, L2, L8 and L10. If the remainder of the division of the x coordinate by two is one, and the remainder of the division of the y coordinate by two is zero, the video coding device may utilize the interpolation filter in Equation (22) to determine the chroma component (e.g., red difference chroma component and/or blue difference chroma component) at a sampling location of a luma component. As shown in FIG. 10, Equation (22) may be utilized to determine the chroma component (e.g., red difference chroma component and/or blue difference chroma component) at the luma component sampling locations L1, L3, L9 and L11.

The chroma component at the sampling location L4 may be derived using Equation (19):

$$C(L4)=(C0*3+C2+2)>>2 \qquad (19)$$

where >>2 may mean the sum of (C0*3+C2+2) is divided by $2^2$ and/or >>2 is calculated using right shift by two. If the sum of (C0*3+C2+2) is not an integer, the decimal may be disregarded prior to dividing the sum by $2^2$. In Equation (19), to determine the chroma component at the sampling location L4, a video coding device may apply an interpolation filter in which the chroma component (e.g., Cr0 or Cb0) at sampling location C0 is multiplied by three, then the sum is added to the chroma component (e.g., Cr2 or Cb2) at a different chroma sampling location C2, and that sum is added to two to determine a final sum. An integer value of the final sum may be determined. The interpolation filer may divide the integer sum by four to determine the chroma component at the sampling location L4. The value of a plurality of chroma components (e.g., cr and cb, u and v, etc.) at the sampling location L4 may be determined using an interpolation filer (e.g., Equation (19)). The chroma component at other sampling locations (e.g., the sampling locations L6, L14, L112) may be determined using Equation (19) using the chroma component at the appropriate sampling locations.

The chroma component at the sampling location L8 may be derived using Equation (20). The chroma component at the sampling location L8 may be similar to the derived chroma component for the sampling location L4. Equation (20) is provided herein:

$$C(L8)=(C0+C2*3+2)>>2 \qquad (20)$$

where >>2 may mean the sum of (C0+C2*3+2) is divided by $2^2$ and/or >>2 is calculated using right shift by two. If the sum of (C0+C2*3+2) is not an integer, the decimal may be disregarded prior to dividing the sum by $2^2$. In Equation (20), to determine the chroma component at the sampling location L8, a video coding device may apply an interpolation filter in which the chroma component (e.g., Cr2 or Cb2) at sampling location C2 is multiplied by three, then the sum is added to the chroma component (e.g., Cr0 or Cb0) at a different sampling location C0, and that sum is added to two to determine a final sum. An integer value of the final sum may be determined. The interpolation filer may divide the integer sum by four to determine the chroma component at the sampling location L8. The chroma component for sampling locations L8, L2, L10 may be determined using Equation (20) with the appropriate sampling locations of the chroma component. The value of a plurality of chroma components (e.g., Cr and Cb, u and v, etc.) at the sampling location L8 may be determined using an interpolation filer (e.g., Equation (20)).

The chroma component at the sampling location L5 may be determined using Equation (21), for example, as follows:

$$C(L5)=((C0+C1)*3+(C2+C3)+4)>>3 \qquad (21)$$

where >>3 may mean the sum of ((C0+C1)*3+(C2+C3)+4) is divided by $2^3$ and/or >>3 is calculated using right shift by three. If the sum of ((C0+C1)*3+(C2+C3)+4) is not an integer, the decimal may be disregarded prior to dividing the sum by $2^3$. In Equation (21), to determine the chroma component at the sampling location L5, a video coding device may apply an interpolation filter in which the chroma component (e.g., Cr0 or Cb0) at sampling location C0 is added to the chroma component (e.g., Cr1 and Cb1) at a different sampling location C1. The video coding device may then multiply the sum of the sampling location C1 and the sampling location C0 by three, and add the multiplied sum to the chroma component at the sampling location C2 (e.g., Cr2 and Cb2), the chroma component at the sampling location C3 (e.g., Cr3 and Cb3) and four to determine a final sum. An integer value of the final sum may be determined. The video coding device may then divide this integer value by eight to determine the chroma component at the sampling location L5. The chroma component for sampling locations L7, L13, L15 may be determined using Equation (21) with the appropriate sampling locations of the chroma component. The value of a plurality of chroma components (e.g., Cr and Cb, u and v, etc.) at the sampling locations L5 may be determined using an interpolation filter (e.g., Equation (21)).

The derived chroma component for luma component at sampling location L9 may be similar to the derived chroma component for the luma component at sampling location L5. The chroma component at the sampling location L9 may be determined using Equation (22), for example, as follows:

$$C(L9)=((C0+C1)+(C2+C5)*3+4)>>3 \qquad (22)$$

where >>3 may mean the sum of ((C0+C1)+(C2 +C5)*3+4) is divided by $2^3$ and/or >>3 is calculated using right shift by three. If the sum of ((C0+C1)+(C2+C5)*3+4) is not an integer, the decimal may be disregarded prior to dividing the sum by $2^3$. In Equation (22), to determine the chroma component at the sampling location L9, a video coding device may apply an interpolation filter in which the chroma component C0 (e.g., Cr0 or Cb0) at sampling location C0 is added to the chroma component C1 (e.g., Cr1 or Cb1) at sampling location C1. The video coding device may then add the chroma component (e.g., Cr2 or Cb2) at sampling location C2 to the chroma component (e.g., Cr5 or Cb5) at a different sampling location C5. The video coding device may then multiply the sum of the chroma component at the sampling location C2 and the chroma component at the sampling location C5 by three, and the multiplied sum may be added to the sum the chroma component at the sampling location C0 and the chroma component at the sampling location C1 and four to determine a final sum. An integer value of the final sum may be determined. The video coding device may then divide this integer value by eight to determine the chroma component at the sampling location L9. The chroma component for sampling locations L11, L1, L3 may be determined using Equation (22) with the appropriate chroma component sampling locations.

The interpolation filter for the luma component at the sampling locations L4 and L8 may be a two-tap filter, for example, a two-tap filter [1, 3] and [3, 1], respectively. For example, the interpolation filer for the luma component at the sampling location L4 and L8 may be the interpolation filter described with reference to Equation (19) and Equation (20), respectively. The interpolation filter for the luma component at the sampling locations L5 and L9 may be a four-tap filter, for example, a four-tap filter [3, 3, 1, 1] and [1, 1, 3, 3], respectively. For example, the interpolation filer for the luma component at the sampling location L5 and L9 may be the interpolation filter described with reference to Equation (21) and Equation (22), respectively.

The video coding device may be configured to apply a first interpolation filter to a chroma component at a first sampling location and the second interpolation to a chroma component at a second sampling location, etc. For example, the video coding device may be configured to apply one or more of Equations (17)-(18) to one or more of two overlapping chroma components (e.g., a red difference chroma component and/or a blue difference chroma component) at one or more sampling locations. For example, the video coding device may apply Equation (17) to the chroma component at a first sampling location then apply Equation (18) to the chroma component at a second sampling location, and then apply Equation (17) to the chroma component at a third sampling location, etc. Similarly, the video coding device may be configured to apply a first interpolation filter to a luma component at a first sampling location and a second interpolation to the luma component at a second sampling location, etc. For example, the video coding device may be configured to apply one or more of Equations (19)-(22) to a luma component at one or more sampling locations. For example, the video coding device may apply Equation (19) to the luma component at a first sampling location, Equation (20) to the luma component at a second sampling location, Equation (21) to the luma component at a third sampling location, Equation (22) to the luma component at a fourth sampling location, etc.

Figure 11A:
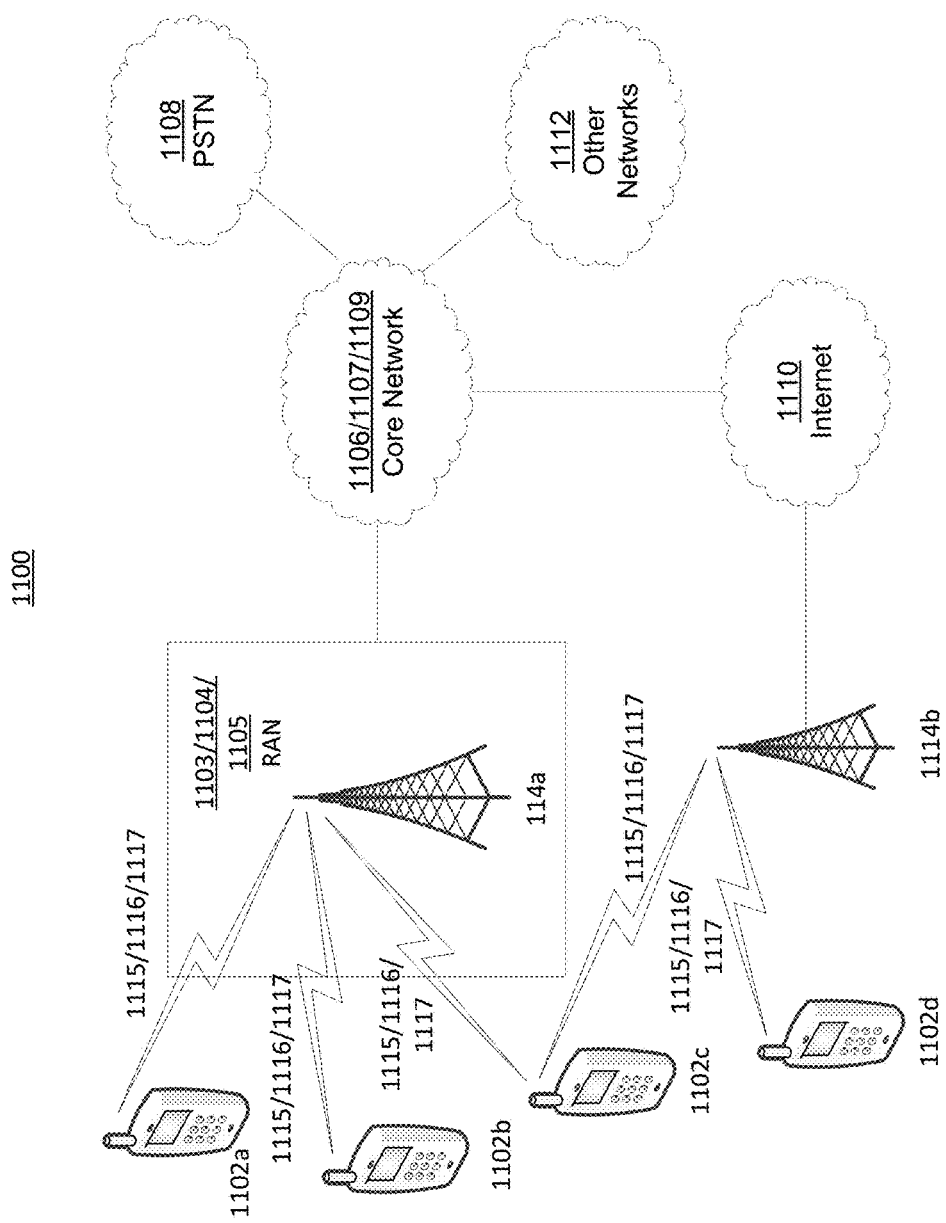
FIG. 11A is a diagram of an example communications system in which one or more disclosed embodiments may be implemented.

FIG. 11A depicts a diagram of an example communications system 1100 in which one or more disclosed embodiments may be implemented and/or may be used. The communications system 1100 may be a multiple access system that provides content, such as voice, data, video, messaging, broadcast, etc., to multiple wireless users. The communications system 1100 may enable multiple wireless users to access such content through the sharing of system resources, including wireless bandwidth. For example, the communications systems 1100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 11A, the communications system 1100 may include wireless transmit/receive units (WTRUs) 1102a, 1102b, 1102c, and/or 1102d (which generally or collectively may be referred to as WTRU 1102), a radio access network (RAN) 1103/1104/1105, a core network 1106/1107/1109, a public switched telephone network (PSTN) 1108, the Internet 1110, and other networks 1112, though it will be appreciated that the disclosed embodiments contemplate any number of WTRUs, base stations, networks, and/or network elements. Each of the WTRUs 1102a, 1102b, 1102c, and/or 1102d may be any type of device configured to operate and/or communicate in a wireless environment. By way of example, the WTRUs 1102a, 1102b, 1102c, and/or 1102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1100 may also include a base station 1114a and a base station 1114b. Each of the base stations 1114a, 1114b may be any type of device configured to wirelessly interface with at least one of the WTRUs 1102a, 1102b, 1102c, and/or 1102d to facilitate access to one or more communication networks, such as the core network 1106/1107/1109, the Internet 1110, and/or the networks 1112. By way of example, the base stations 1114a and/or 1114b may be a base transceiver station (BTS), a Node-B, an eNode B, a Home Node B, a Home eNode B, a site controller, an access point (AP), a wireless router, and the like. While the base stations 1114a, 1114b are each depicted as a single element, it will be appreciated that the base stations 1114a, 1114b may include any number of interconnected base stations and/or network elements.

The base station 1114a may be part of the RAN 1103/1104/1105, which may also include other base stations and/or network elements (not shown), such as a base station controller (BSC), a radio network controller (RNC), relay nodes, etc. The base station 1114a and/or the base station 1114b may be configured to transmit and/or receive wireless signals within a particular geographic region, which may be referred to as a cell (not shown). The cell may further be divided into cell sectors. For example, the cell associated with the base station 1114a may be divided into three sectors. Thus, in one embodiment, the base station 1114a may include three transceivers, i.e., one for each sector of the cell. In another embodiment, the base station 1114a may employ multiple-input multiple output (MIMO) technology and, therefore, may utilize multiple transceivers for each sector of the cell.

The base stations 1114a and/or 1114b may communicate with one or more of the WTRUs 1102a, 1102b, 1102c, and/or 1102d over an air interface 1115/1116/1117, which may be any suitable wireless communication link (e.g., radio frequency (RF), microwave, infrared (IR), ultraviolet (UV), visible light, etc.). The air interface 1115/1116/1117 may be established using any suitable radio access technology (RAT).

More specifically, as noted above, the communications system 1100 may be a multiple access system and may employ one or more channel access schemes, such as CDMA, TDMA, FDMA, OFDMA, SC-FDMA, and the like. For example, the base station 1114a in the RAN 1103/1104/1105 and the WTRUs 1102a, 1102b, and/or 1102c may implement a radio technology such as Universal Mobile Telecommunications System (UMTS) Terrestrial Radio Access (UTRA), which may establish the air interface 1115/1116/1117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1114a and the WTRUs 1102a, 1102b, and/or 1102c may implement a radio technology such as Evolved UMTS Terrestrial Radio Access (E-UTRA), which may establish the air interface 1115/1116/1117 using Long Term Evolution (LTE) and/or LTE-Advanced (LTE-A).

In other embodiments, the base station 1114a and the WTRUs 1102a, 1102b, and/or 1102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1114b in FIG. 11A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1114b and the WTRUs 1102c, 1102d may implement a radio technology such as IEEE 802.11 to establish a wireless local area network (WLAN). In another embodiment, the base station 1114b and the WTRUs 1102c, 1102d may implement a radio technology such as IEEE 802.15 to establish a wireless personal area network (WPAN). In yet another embodiment, the base station 114b and the WTRUs 102c, 1102d may utilize a cellular-based RAT (e.g., WCDMA, CDMA2000, GSM, LTE, LTE-A, etc.) to establish a picocell or femtocell. As shown in FIG. 11A, the base station 1114b may have a direct connection to the Internet 1110. Thus, the base station 1114b may not be required to access the Internet 1110 via the core network 1106/1107/1109.

The RAN 1103/1104/1105 may be in communication with the core network 1106/1107/1109, which may be any type of network configured to provide voice, data, applications, and/or voice over internet protocol (VoIP) services to one or more of the WTRUs 1102a, 1102b, 1102c, and/or 1102d. For example, the core network 1106/1107/1109 may provide call control, billing services, mobile location-based services, pre-paid calling, Internet connectivity, video distribution, etc., and/or perform high-level security functions, such as user authentication. Although not shown in FIG. 11A, it will be appreciated that the RAN 1103/1104/1105 and/or the core network 1106/1107/1109 may be in direct or indirect communication with other RANs that employ the same RAT as the RAN 1103/1104/1105 or a different RAT. For example, in addition to being connected to the RAN 1103/1104/1105, which may be utilizing an E-UTRA radio technology, the core network 1106/1107/1109 may also be in communication with another RAN (not shown) employing a GSM radio technology.

The core network 1106/1107/1109 may also serve as a gateway for the WTRUs 1102a, 1102b, 1102c, and/or 1102d to access the PSTN 1108, the Internet 1110, and/or other networks 112. The PSTN 1108 may include circuit-switched telephone networks that provide plain old telephone service (POTS). The Internet 1110 may include a global system of interconnected computer networks and devices that use common communication protocols, such as the transmission control protocol (TCP), user datagram protocol (UDP) and the internet protocol (IP) in the TCP/IP internet protocol suite. The networks 1112 may include wired or wireless communications networks owned and/or operated by other service providers. For example, the networks 1112 may include another core network connected to one or more RANs, which may employ the same RAT as the RAN 1103/1104/1105 or a different RAT.

Some or all of the WTRUs 1102a, 1102b, 1102c, and/or 1102d in the communications system 1100 may include multi-mode capabilities, i.e., the WTRUs 1102a, 1102b, 1102c, and/or 1102d may include multiple transceivers for communicating with different wireless networks over different wireless links. For example, the WTRU 1102c shown in FIG. 11A may be configured to communicate with the base station 1114a, which may employ a cellular-based radio technology, and with the base station 1114b, which may employ an IEEE 802 radio technology.

Figure 11B:
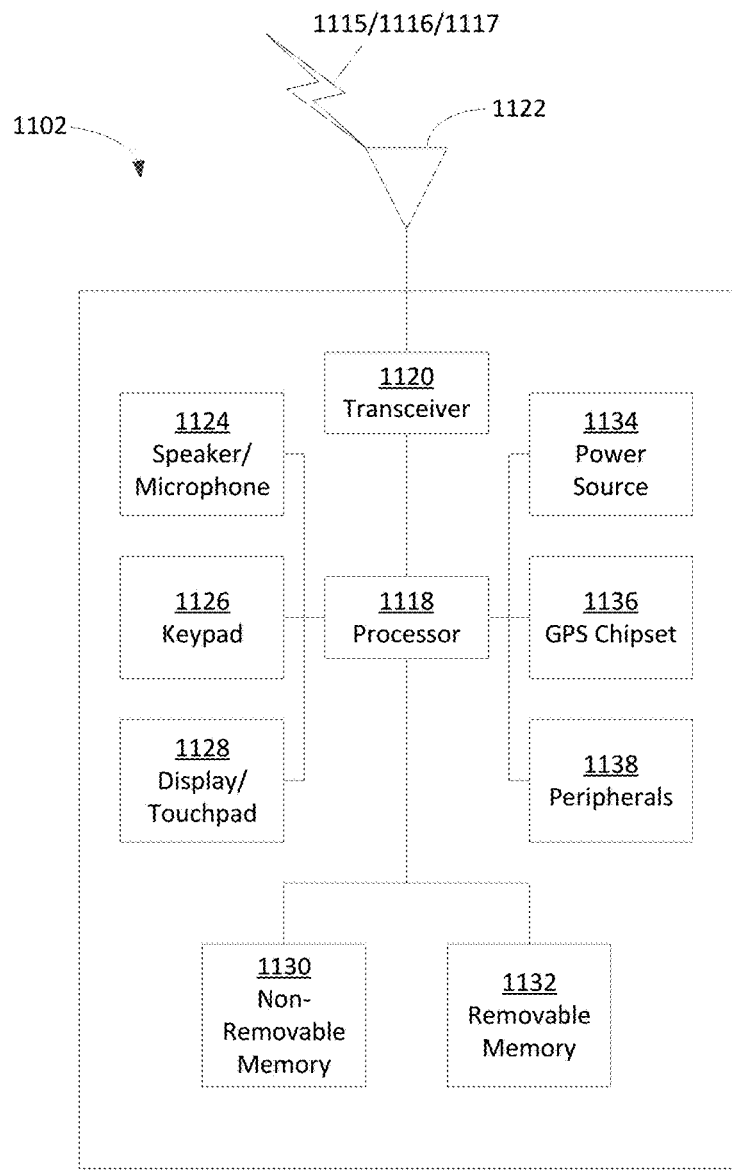
FIG. 11B is a system diagram of an example wireless transmit/receive unit (WTRU) that may be used within the communications system illustrated in FIG. 11A.

FIG. 11B depicts a system diagram of an example WTRU 1102. As shown in FIG. 11B, the WTRU 1102 may include a processor 1118, a transceiver 1120, a transmit/receive element 1122, a speaker/microphone 1124, a keypad 1126, a display/touchpad 1128, non-removable memory 1130, removable memory 1132, a power source 1134, a global positioning system (GPS) chipset 1136, and other peripherals 1138. It will be appreciated that the WTRU 1102 may include any sub-combination of the foregoing elements while remaining consistent with an embodiment. Also, embodiments contemplate that the base stations 1114a and 1114b, and/or the nodes that base stations 1114a and 1114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 11B and described herein.

The processor 1118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1118 may perform signal coding, data processing, power control, input/output processing, and/or any other functionality that enables the WTRU 1102 to operate in a wireless environment. The processor 1118 may be coupled to the transceiver 1120, which may be coupled to the transmit/receive element 1122. While FIG. 11B depicts the processor 1118 and the transceiver 1120 as separate components, it may be appreciated that the processor 1118 and the transceiver 1120 may be integrated together in an electronic package or chip.

The transmit/receive element 1122 may be configured to transmit signals to, or receive signals from, a base station (e.g., the base station 1114a) over the air interface 1115/1116/1117. For example, in one embodiment, the transmit/receive element 1122 may be an antenna configured to transmit and/or receive RF signals. In another embodiment, the transmit/receive element 1122 may be an emitter/detector configured to transmit and/or receive IR, UV, or visible light signals, for example. In yet another embodiment, the transmit/receive element 1122 may be configured to transmit and receive both RF and light signals. It will be appreciated that the transmit/receive element 1122 may be configured to transmit and/or receive any combination of wireless signals.

In addition, although the transmit/receive element 1122 is depicted in FIG. 11B as a single element, the WTRU 1102 may include any number of transmit/receive elements 1122. More specifically, the WTRU 1102 may employ MIMO technology. Thus, in one embodiment, the WTRU 1102 may include two or more transmit/receive elements 1122 (e.g., multiple antennas) for transmitting and receiving wireless signals over the air interface 1115/1116/1117.

The transceiver 1120 may be configured to modulate the signals that are to be transmitted by the transmit/receive element 1122 and to demodulate the signals that are received by the transmit/receive element 1122. As noted above, the WTRU 1102 may have multi-mode capabilities. Thus, the transceiver 1120 may include multiple transceivers for enabling the WTRU 1102 to communicate via multiple RATs, such as UTRA and IEEE 802.11, for example.

The processor 1118 of the WTRU 1102 may be coupled to, and may receive user input data from, the speaker/microphone 1124, the keypad 1126, and/or the display/touchpad 1128 (e.g., a liquid crystal display (LCD) display unit or organic light-emitting diode (OLED) display unit). The processor 1118 may also output user data to the speaker/microphone 1124, the keypad 1126, and/or the display/touchpad 1128. In addition, the processor 1118 may access information from, and store data in, any type of suitable memory, such as the non-removable memory 1130 and/or the removable memory 1132. The non-removable memory 1130 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, the processor 1118 may access information from, and store data in, memory that is not physically located on the WTRU 1102, such as on a server or a home computer (not shown).

The processor 1118 may receive power from the power source 1134, and may be configured to distribute and/or control the power to the other components in the WTRU 1102. The power source 1134 may be any suitable device for powering the WTRU 1102. For example, the power source 1134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1118 may also be coupled to the GPS chipset 1136, which may be configured to provide location information (e.g., longitude and latitude) regarding the current location of the WTRU 1102. In addition to, or in lieu of, the information from the GPS chipset 1136, the WTRU 1102 may receive location information over the air interface 1115/1116/1117 from a base station (e.g., base stations 1114a, 1114b) and/or determine its location based on the timing of the signals being received from two or more nearby base stations. It will be appreciated that the WTRU 1102 may acquire location information by way of any suitable location-determination method while remaining consistent with an embodiment.

The processor 1118 may further be coupled to other peripherals 1138, which may include one or more software and/or hardware modules that provide additional features, functionality and/or wired or wireless connectivity. For example, the peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 11C:
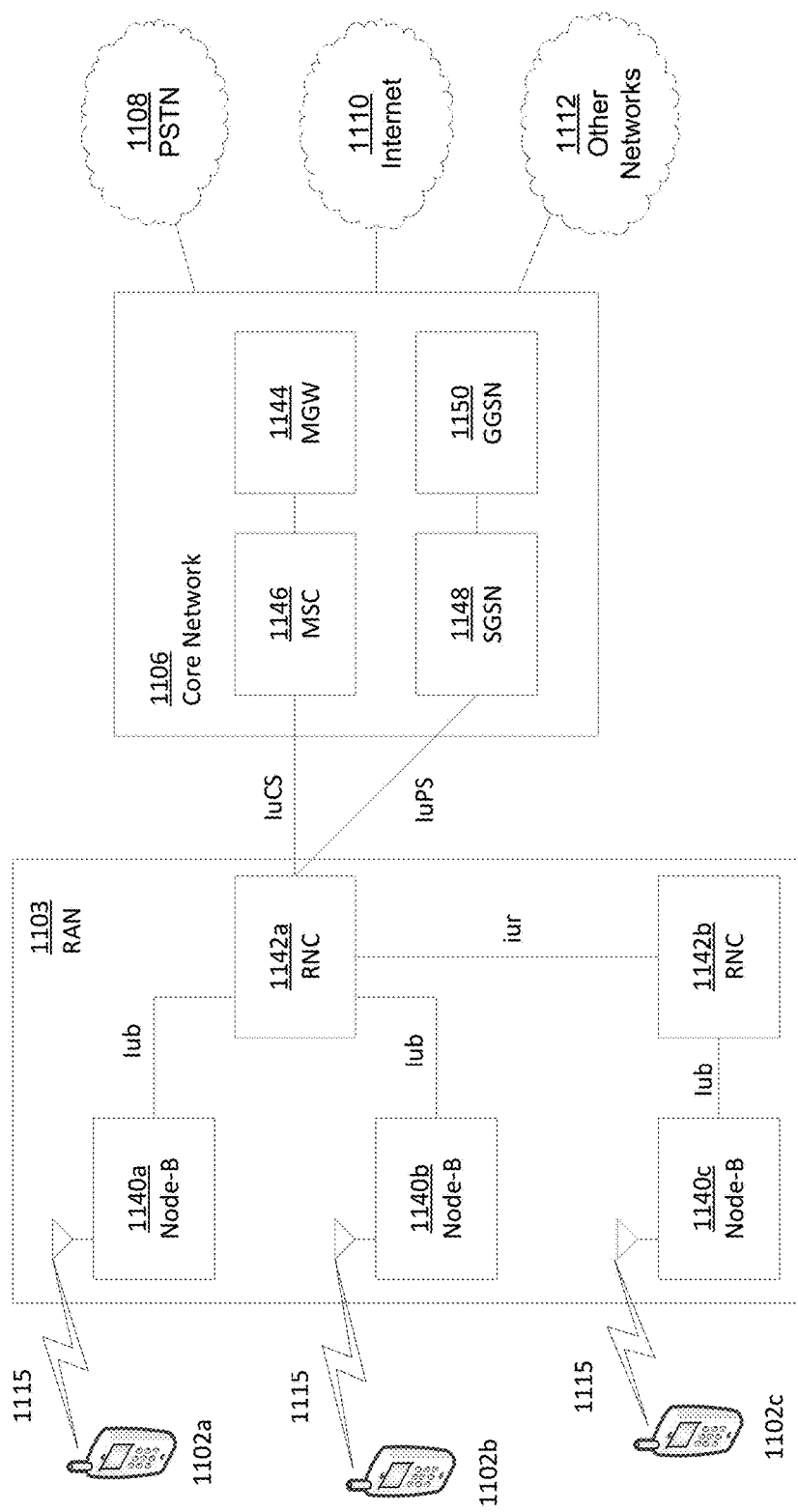
FIG. 11C is a system diagram of an example radio access network and an example core network that may be used within the communications system illustrated in FIG. 11A.

FIG. 11C depicts a system diagram of the RAN 1103 and the core network 1106 according to an embodiment. As noted above, the RAN 1103 may employ a UTRA radio technology to communicate with the WTRUs 1102a, 1102b, and/or 1102c over the air interface 1115. The RAN 1103 may also be in communication with the core network 1106. As shown in FIG. 11C, the RAN 1103 may include Node-Bs 1140a, 1140b, and/or 1140c, which may each include one or more transceivers for communicating with the WTRUs 1102a, 1102b, and/or 1102c over the air interface 1115. The Node-Bs 1140a, 1140b, and/or 1140c may each be associated with a particular cell (not shown) within the RAN 1103. The RAN 1103 may also include RNCs 1142a and/or 1142b. It will be appreciated that the RAN 1103 may include any number of Node-Bs and RNCs while remaining consistent with an embodiment.

As shown in FIG. 11C, the Node-Bs 1140a and/or 1140b may be in communication with the RNC 1142a. Additionally, the Node-B 1140c may be in communication with the RNC 1142b. The Node-Bs 1140a, 1140b, and/or 1140c may communicate with the respective RNCs 1142a, 1142b via an Iub interface. The RNCs 1142a, 1142b may be in communication with one another via an Iur interface. Each of the RNCs 1142a, 1142b may be configured to control the respective Node-Bs 1140a, 1140b, and/or 1140c to which it is connected. In addition, each of the RNCs 1142a, 1142b may be configured to carry out or support other functionality, such as outer loop power control, load control, admission control, packet scheduling, handover control, macrodiversity, security functions, data encryption, and the like.

The core network 1106 shown in FIG. 11C may include a media gateway (MGW) 1144, a mobile switching center (MSC) 1146, a serving GPRS support node (SGSN) 1148, and/or a gateway GPRS support node (GGSN) 1150. While each of the foregoing elements are depicted as part of the core network 1106, it will be appreciated that any one of these elements may be owned and/or operated by an entity other than the core network operator.

The RNC 1142a in the RAN 1103 may be connected to the MSC 1146 in the core network 1106 via an IuCS interface. The MSC 1146 may be connected to the MGW 1144. The MSC 1146 and the MGW 1144 may provide the WTRUs 1102a, 1102b, and/or 1102c with access to circuit-switched networks, such as the PSTN 1108, to facilitate communications between the WTRUs 1102a, 1102b, and/or 1102c and traditional land-line communications devices.

The RNC 1142a in the RAN 1103 may also be connected to the SGSN 1148 in the core network 1106 via an IuPS interface. The SGSN 1148 may be connected to the GGSN 1150. The SGSN 1148 and the GGSN 1150 may provide the WTRUs 1102a, 1102b, and/or 1102c with access to packet-switched networks, such as the Internet 1110, to facilitate communications between and the WTRUs 1102a, 1102b, and/or 1102c and IP-enabled devices.

As noted above, the core network 1106 may also be connected to the networks 1112, which may include other wired or wireless networks that are owned and/or operated by other service providers.

Figure 11D:
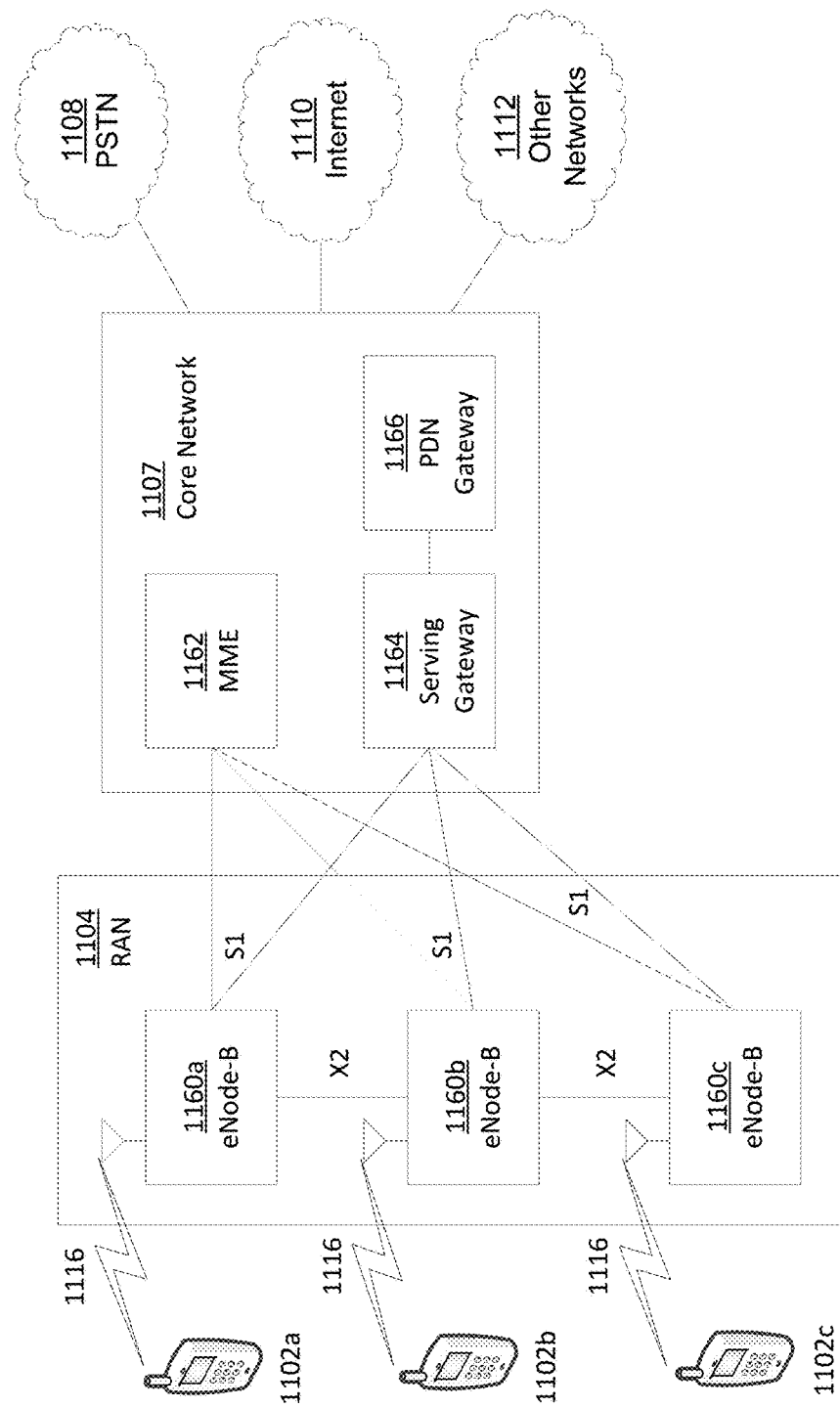
FIG. 11D is a system diagram of another example radio access network and an example core network that may be used within the communications system illustrated in FIG. 11A.

FIG. 11D depicts a system diagram of the RAN 1104 and the core network 1107 according to an embodiment. As noted above, the RAN 1104 may employ an E-UTRA radio technology to communicate with the WTRUs 1102a, 1102b, and/or 1102c over the air interface 1116. The RAN 1104 may also be in communication with the core network 1107.

The RAN 1104 may include eNode-Bs 1160a, 1160b, and/or 1160c, though it will be appreciated that the RAN 1104 may include any number of eNode-Bs while remaining consistent with an embodiment. The eNode-Bs 1160a, 1160b, and/or 1160c may each include one or more transceivers for communicating with the WTRUs 1102a, 1102b, and/or 1102c over the air interface 1116. In one embodiment, the eNode-Bs 1160a, 1160b, and/or 1160c may implement MIMO technology. Thus, the eNode-B 1160a, for example, may use multiple antennas to transmit wireless signals to, and receive wireless signals from, the WTRU 1102a.

Each of the eNode-Bs 1160a, 1160b, and/or 1160c may be associated with a particular cell (not shown) and may be configured to handle radio resource management decisions, handover decisions, scheduling of users in the uplink and/or downlink, and the like. As shown in FIG. 11D, the eNode-Bs 1160a, 1160b, and/or 1160c may communicate with one another over an X2 interface.

The core network 1107 shown in FIG. 11D may include a mobility management gateway (MME) 1162, a serving gateway 1164, and a packet data network (PDN) gateway 1166. While each of the foregoing elements are depicted as part of the core network 1107, it will be appreciated that any one of these elements may be owned and/or operated by an entity other than the core network operator.

The MME 1162 may be connected to each of the eNode-Bs 1160a, 1160b, and/or 1160c in the RAN 1104 via an S1 interface and may serve as a control node. For example, the MME 1162 may be responsible for authenticating users of the WTRUs 1102a, 1102b, and/or 1102c, bearer activation/deactivation, selecting a particular serving gateway during an initial attach of the WTRUs 1102a, 1102b, and/or 1102c, and the like. The MME 1162 may also provide a control plane function for switching between the RAN 104 and other RANs (not shown) that employ other radio technologies, such as GSM or WCDMA.

The serving gateway 1164 may be connected to each of the eNode-Bs 1160a, 1160b, and/or 1160c in the RAN 1104 via the S1 interface. The serving gateway 1164 may generally route and forward user data packets to/from the WTRUs 1102a, 1102b, and/or 1102c. The serving gateway 1164 may also perform other functions, such as anchoring user planes during inter-eNode B handovers, triggering paging when downlink data is available for the WTRUs 1102a, 1102b, and/or 1102c, managing and storing contexts of the WTRUs 1102a, 1102b, and/or 1102c, and the like.

The serving gateway 1164 may also be connected to the PDN gateway 1166, which may provide the WTRUs 1102a, 1102b, and/or 1102c with access to packet-switched networks, such as the Internet 1110, to facilitate communications between the WTRUs 1102a, 1102b, and/or 1102c and IP-enabled devices.

The core network 1107 may facilitate communications with other networks. For example, the core network 1107 may provide the WTRUs 1102a, 1102b, and/or 1102c with access to circuit-switched networks, such as the PSTN 1108, to facilitate communications between the WTRUs 1102a, 1102b, and/or 1102c and traditional land-line communications devices. For example, the core network 1107 may include, or may communicate with, an IP gateway (e.g., an IP multimedia subsystem (IMS) server) that serves as an interface between the core network 1107 and the PSTN 1108. In addition, the core network 1107 may provide the WTRUs 1102a, 1102b, and/or 1102c with access to the networks 1112, which may include other wired or wireless networks that are owned and/or operated by other service providers.

Figure 11E:
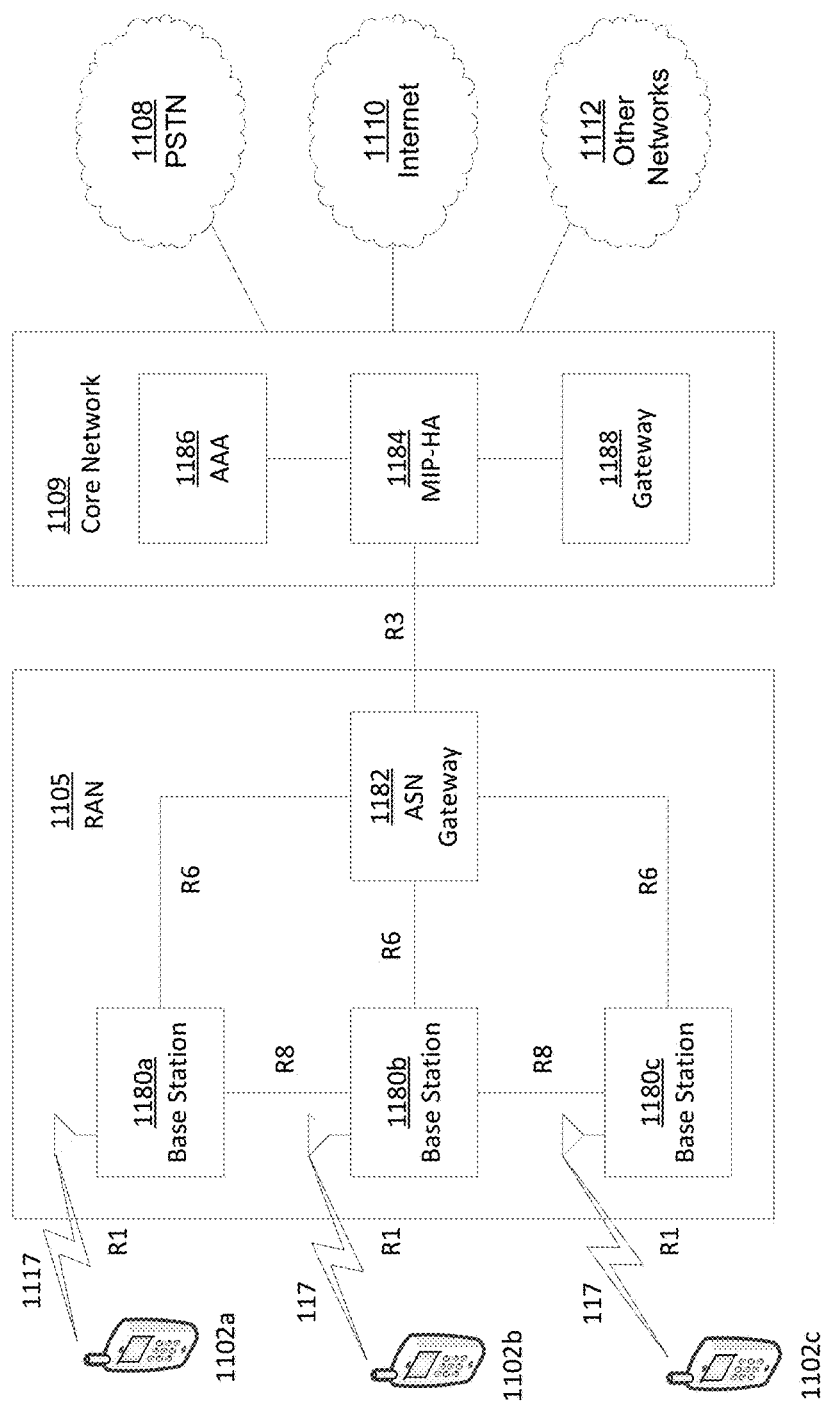
FIG. 11E is a system diagram of another example radio access network and an example core network that may be used within the communications system illustrated in FIG. 11A.

FIG. 11E depicts a system diagram of the RAN 1105 and the core network 1109 according to an embodiment. The RAN 1105 may be an access service network (ASN) that employs IEEE 802.16 radio technology to communicate with the WTRUs 1102a, 1102b, and/or 1102c over the air interface 1117. As will be further discussed below, the communication links between the different functional entities of the WTRUs 1102a, 1102b, and/or 1102c, the RAN 1105, and the core network 1109 may be defined as reference points.

As shown in FIG. 11E, the RAN 1105 may include base stations 1180a, 1180b, and/or 1180c, and an ASN gateway 1182, though it will be appreciated that the RAN 1105 may include any number of base stations and ASN gateways while remaining consistent with an embodiment. The base stations 1180a, 1180b, and/or 1180c may each be associated with a particular cell (not shown) in the RAN 1105 and may each include one or more transceivers for communicating with the WTRUs 1102a, 1102b, and/or 1102c over the air interface 1117. In one embodiment, the base stations 1180a, 1180b, and/or 1180c may implement MIMO technology. Thus, the base station 1180a, for example, may use multiple antennas to transmit wireless signals to, and receive wireless signals from, the WTRU 1102a. The base stations 1180a, 1180b, and/or 1180c may also provide mobility management functions, such as handoff triggering, tunnel establishment, radio resource management, traffic classification, quality of service (QoS) policy enforcement, and the like. The ASN gateway 1182 may serve as a traffic aggregation point and may be responsible for paging, caching of subscriber profiles, routing to the core network 1109, and the like.

The air interface 1117 between the WTRUs 1102a, 1102b, and/or 1102c and the RAN 1105 may be defined as an R1 reference point that implements the IEEE 802.16 specification. In addition, each of the WTRUs 1102a, 1102b, and/or 1102c may establish a logical interface (not shown) with the core network 1109. The logical interface between the WTRUs 1102a, 1102b, and/or 1102c and the core network 1109 may be defined as an R2 reference point, which may be used for authentication, authorization, IP host configuration management, and/or mobility management.

The communication link between each of the base stations 1180a, 1180b, and/or 1180c may be defined as an R8 reference point that includes protocols for facilitating WTRU handovers and the transfer of data between base stations. The communication link between the base stations 1180a, 1180b, and/or 1180c and the ASN gateway 1182 may be defined as an R6 reference point. The R6 reference point may include protocols for facilitating mobility management based on mobility events associated with each of the WTRUs 1102a, 1102b, and/or 1102c.

As shown in FIG. 11E, the RAN 1105 may be connected to the core network 1109. The communication link between the RAN 1105 and the core network 1109 may defined as an R3 reference point that includes protocols for facilitating data transfer and mobility management capabilities, for example. The core network 1109 may include a mobile IP home agent (MIP-HA) 1184, an authentication, authorization, accounting (AAA) server 1186, and a gateway 1188. While each of the foregoing elements are depicted as part of the core network 1109, it will be appreciated that any one of these elements may be owned and/or operated by an entity other than the core network operator.

The MIP-HA may be responsible for IP address management, and may enable the WTRUs 1102a, 1102b, and/or 1102c to roam between different ASNs and/or different core networks. The MIP-HA 1184 may provide the WTRUs 1102a, 1102b, and/or 1102c with access to packet-switched networks, such as the Internet 1110, to facilitate communications between the WTRUs 1102a, 1102b, and/or 1102c and IP-enabled devices. The AAA server 1186 may be responsible for user authentication and for supporting user services. The gateway 1188 may facilitate interworking with other networks. For example, the gateway 1188 may provide the WTRUs 1102a, 1102b, and/or 1102c with access to circuit-switched networks, such as the PSTN 1108, to facilitate communications between the WTRUs 1102a, 1102b, and/or 1102c and traditional land-line communications devices. In addition, the gateway 1188 may provide the WTRUs 1102a, 1102b, and/or 1102c with access to the networks 1112, which may include other wired or wireless networks that are owned and/or operated by other service providers.

Although not shown in FIG. 11E, it should, may, and/or will be appreciated that the RAN 1105 may be connected to other ASNs and the core network 1109 may be connected to other core networks. The communication link between the RAN 1105 the other ASNs may be defined as an R4 reference point, which may include protocols for coordinating the mobility of the WTRUs 1102*a*, 1102*b*, and/or 1102*c* between the RAN 1105 and the other ASNs. The communication link between the core network 1109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video coding device, comprising:
a processor configured to:
receive a picture associated with a first color space associated with a first color gamut, wherein the picture comprises a first component at a first sampling location, a second component at a second sampling location and the second component at a third sampling location;
apply a first interpolation filter to the second component at the second sampling location and the second component at the third sampling location to determine the second component at the first sampling location, wherein the second component at the first sampling location is associated with the first color space; and
apply color conversion to the first component at the first sampling location and to the second component at the first sampling location to translate the first component at the first sampling location to a second color space associated with a second color gamut.

2. The video coding device of claim 1, wherein the first component is a luma component and the second component is a first chroma component or a second chroma component, or wherein the first component is the first chroma component or the second chroma component and the second component is the luma component.

3. The video coding device of claim 1, wherein the processor is further configured to:
add the second component at the second sampling location, the second component at the third sampling location, and one to determine a sum; and
divide the sum by two.

4. The video coding device of claim 1, wherein the processor is further configured to:
multiply the second component at the second sampling location by three;
add the multiplied second component at the second sampling location, the second component at the third sampling location, and two to determine a sum; and
divide the sum by four.

5. The video coding device of claim 1, wherein the picture comprises the second component at a fourth sampling location and the second component at a fifth sampling location and wherein the processor is configured to apply the first interpolation filter to the second component at the second sampling location, the second component at the third sampling location, the second component at the fourth sampling location, and the second component at the fifth sampling location to determine the second component at the first sampling location.

6. The video coding device of claim 5, wherein the processor is further configured to:
add the second component at the second sampling location and the second component at the third sampling location to determine a first sum;
add the second component at the fourth sampling location and the second component at the fifth sampling location to determine a second sum;
multiply the second sum by three to determine a third sum;
add the first sum, the third sum, and four to determine a fourth sum; and
divide the fourth sum by eight.

7. The video coding device of claim 1, wherein the picture comprises a third component at the second sampling location and the third component at the third sampling location, wherein the first component is a luma component, the second component is a first chroma component, and the third component is a second chroma component, and wherein the processor is further configured to:
apply the first interpolation filter to the third component at the second sampling location and the third component at the third sampling location to determine the third component at the first sampling location, wherein the third component at the first sampling location is associated with the first color space; and
apply color conversion to the first component at the first sampling location, to the second component at the first sampling location, and to the third component at the first sampling location to translate the first component at the first sampling location to the second color space.

8. The video coding device of claim 1, wherein the picture comprises a third component at the first sampling location, and wherein the processor is further configured to:
apply color conversion to the first component at the first sampling location, to the third component at the first sampling location and to the second component at the first sampling location to translate the first component at the first sampling location to the second color space.

9. The video coding device of claim 8, wherein the first component is a first chroma component, the second component is a luma component, and the third component is a second chroma component, or wherein the first component is the second chroma component, the second component is the luma component, and the third component is the first chroma component.

10. The video coding device of claim 1, wherein the picture is characterized by a 4:2:0 chroma format or a 4:2:2 chroma format.

11. A video coding method, comprising:
receiving a picture associated with a first color space associated with a first color gamut, wherein the picture comprises a first component at a first sampling location, a second component at a second sampling location and the second component at a third sampling location;
applying a first interpolation filter to the second component at the second sampling location and the second component at the third sampling location to determine the second component at the first sampling location, wherein the second component at the first sampling location is associated with the first color space; and
applying color conversion to the first component at the first sampling location and to the second component at the first sampling location to translate the first component at the first sampling location to a second color space associated with a second color gamut.

12. The video coding method of claim 11, wherein the first component is a luma component and the second component is a first chroma component or a second chroma component, or wherein the first component is the first chroma component or the second chroma component and the second component is the luma component.

13. The video coding method of claim 11, wherein the picture comprises the second component at a fourth sampling location and the second component at a fifth sampling location, and wherein the method further comprises:
applying the first interpolation filter to the second component at the second sampling location, the second component at the third sampling location, the second component at the fourth sampling location, and the second component at the fifth sampling location to determine the second component at the first sampling location.

14. The video coding method of claim 11, wherein the picture comprises a third component at the second sampling location and the third component at the third sampling location, wherein the first component is a luma component, the second component is a first chroma component, and the third component is a second chroma component, and wherein the method further comprises:
applying the first interpolation filter to the third component at the second sampling location and the third component at the third sampling location to determine the third component at the first sampling location, wherein the third component at the first sampling location is associated with the first color space; and
applying color conversion to the first component at the first sampling location, to the second component at the first sampling location, and to the third component at the first sampling location to translate the first component at the first sampling location to the second color space.

15. The video coding method of claim 11, wherein the picture comprises a third component at the first sampling location, and wherein the method further comprises:
applying color conversion to the first component at the first sampling location, to the third component at the first sampling location and to the second component at the first sampling location to translate the first component at the first sampling location to the second color space.

16. The video coding method of claim 15, wherein the first component is a first chroma component, the second component is a luma component, and the third component is a second chroma component, or wherein the first component is the second chroma component, the second component is the luma component, and the third component is the first chroma component.

17. The video coding method of claim 11, wherein the picture is characterized by a 4:2:0 chroma format or a 4:2:2 chroma format.

18. The video coding method of claim 11, further comprising:
receiving a scalable bitstream, the scalable bitstream comprising a base layer and an enhancement layer, wherein the base layer comprises the picture, the base layer is associated with the first color space and the enhancement layer is associated with the second color space, and the color-converted first and second components are used for inter-layer prediction.

19. A video coding device, comprising:
a processor configured to:
receive a picture associated with a first color space associated with a first color gamut, wherein the picture is characterized by a chroma format where luma sampling locations and chroma sampling locations are misaligned, and the picture comprises a luma component at a first sampling location, a first chroma component at a second sampling location, a second chroma component at the second sampling location, the first chroma component at a third sampling location, the second chroma component at the third sampling location, the first chroma component at a fourth sampling location, the second chroma component at the fourth sampling location, the first chroma component at a fifth sampling location, and the second chroma component at the fifth sampling location;
apply an interpolation filter to two or more of the first chroma component at the second sampling location, the first chroma component at the third sampling location, the first chroma component at the fourth sampling location, and the first chroma component at the fifth sampling location to determine the first chroma component at the first sampling location of the luma component, wherein the first chroma component at the first sampling location is associated with the first color space;
apply the interpolation filter to two or more of the second chroma component at the second sampling location, the second chroma component at the third sampling location, the second chroma component at the fourth sampling location, and the second chroma component at the fifth sampling location to determine the second chroma component at the first sampling location of the luma component, wherein the second chroma component at the first sampling location is associated with the first color space; and
apply color conversion to the luma component at the first sampling location, the first chroma component at the first sampling location, and the second chroma component at the first sampling location to translate the luma component at the first sampling location from the first color space to a second color space associated with a second color gamut.

* * * * *